(12) United States Patent
Weimer et al.

(10) Patent No.: US 8,736,818 B2
(45) Date of Patent: May 27, 2014

(54) ELECTRONICALLY STEERED FLASH LIDAR

(75) Inventors: Carl S. Weimer, Boluder, CO (US);
Tanya M. Ramond, Louisville, CO (US); Carl M. Adkins, Broomfield, CO (US); Jeff T. Applegate, Superior, CO (US); Thomas P. Delker, Lyons, CO (US); Lyle S. Ruppert, Longmont, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 878 days.

(21) Appl. No.: 12/857,354

(22) Filed: Aug. 16, 2010

(65) Prior Publication Data
US 2012/0038903 A1 Feb. 16, 2012

(51) Int. Cl.
*G01C 3/08* (2006.01)
*G01J 1/42* (2006.01)
*G01N 21/51* (2006.01)

(52) U.S. Cl.
USPC ............... 356/4.07; 356/445; 250/208.2

(58) Field of Classification Search
USPC ............................................... 356/4.07
See application file for complete search history.

(56) References Cited

U.S. PATENT DOCUMENTS

| | | |
|---|---|---|
| 4,022,532 A | 5/1977 | Montagnino |
| 4,201,468 A | 5/1980 | Margolis et al. |
| 4,286,877 A | 9/1981 | Clarke |
| 4,730,320 A | 3/1988 | Hidaka et al. |
| 5,029,023 A | 7/1991 | Bearden et al. |
| 5,091,778 A | 2/1992 | Keeler |
| 5,192,978 A | 3/1993 | Keeler |
| 5,317,376 A | 5/1994 | Amzajerdian et al. |
| 5,345,304 A | 9/1994 | Allen |
| 5,357,371 A | 10/1994 | Minott |
| 5,485,009 A | 1/1996 | Meyzonnetie et al. |
| 5,528,354 A | 6/1996 | Uwira |
| 5,552,893 A * | 9/1996 | Akasu .......................... 356/5.01 |
| 5,682,225 A | 10/1997 | DuBois et al. |
| 5,682,229 A | 10/1997 | Wangler |

(Continued)

FOREIGN PATENT DOCUMENTS

| | | |
|---|---|---|
| EP | 0578129 | 1/1994 |
| GB | 2300325 | 10/1996 |

(Continued)

OTHER PUBLICATIONS

Notice of Allowance and Fee(s) Due for U.S. Patent Appl. No. 12/464,009, mailed Jan. 21, 2011, 10 pages.

(Continued)

*Primary Examiner* — Isam Alsomiri
*Assistant Examiner* — Vicente Rodriguez
(74) *Attorney, Agent, or Firm* — Sheridan Ross P.C.

(57) ABSTRACT

Methods and systems for adaptively controlling the illumination of a scene are provided. In particular, a scene is illuminated, and light reflected from the scene is detected. Information regarding levels of light intensity received by different pixels of a multiple pixel detector, corresponding to different areas within a scene, and/or information regarding a range to an area within a scene, is received. That information is then used as a feedback signal to control levels of illumination within the scene. More particularly, different areas of the scene can be provided with different levels of illumination in response to the feedback signal.

13 Claims, 16 Drawing Sheets

(56) References Cited

U.S. PATENT DOCUMENTS

| | | | |
|---|---|---|---|
| 5,784,023 A | 7/1998 | Bluege | |
| 5,793,034 A | 8/1998 | Wesolowicz et al. | |
| 5,815,250 A * | 9/1998 | Thomson et al. | 356/5.01 |
| 5,847,816 A | 12/1998 | Zediker et al. | |
| 5,870,180 A | 2/1999 | Wangler | |
| 5,870,181 A | 2/1999 | Andressen | |
| 5,914,776 A | 6/1999 | Streicher | |
| 5,917,596 A | 6/1999 | Jenkins et al. | |
| 5,923,466 A | 7/1999 | Krause et al. | |
| 6,034,770 A | 3/2000 | Kim et al. | |
| 6,173,066 B1 | 1/2001 | Peurach et al. | |
| 6,323,941 B1 | 11/2001 | Evans et al. | |
| 6,411,871 B1 | 6/2002 | Lin | |
| 6,414,746 B1 | 7/2002 | Stettner et al. | |
| 6,434,211 B1 | 8/2002 | Lloyd et al. | |
| 6,448,572 B1 | 9/2002 | Tennant et al. | |
| 6,542,831 B1 | 4/2003 | Moosmuller et al. | |
| 6,608,669 B2 | 8/2003 | Holton | |
| 6,646,725 B1 | 11/2003 | Eichinger et al. | |
| 6,657,733 B1 | 12/2003 | Drake, Jr. | |
| 6,664,529 B2 | 12/2003 | Pack et al. | |
| 6,665,063 B2 | 12/2003 | Jamieson et al. | |
| 6,747,258 B2 | 6/2004 | Benz et al. | |
| 6,804,607 B1 | 10/2004 | Wood | |
| 6,943,868 B2 | 9/2005 | Haig | |
| 6,972,887 B2 | 12/2005 | Wickham et al. | |
| 7,006,203 B1 | 2/2006 | Book et al. | |
| 7,095,488 B2 | 8/2006 | Jamieson et al. | |
| 7,113,886 B2 | 9/2006 | West | |
| 7,142,981 B2 | 11/2006 | Hablani | |
| 7,224,466 B2 | 5/2007 | Ray | |
| 7,224,707 B2 | 5/2007 | Gendron | |
| 7,236,235 B2 | 6/2007 | Dimsdale | |
| 7,240,879 B1 | 7/2007 | Cepollina et al. | |
| 7,277,641 B1 | 10/2007 | Gleckman | |
| 7,342,228 B1 | 3/2008 | O'Connell et al. | |
| 7,345,743 B1 | 3/2008 | Hartman et al. | |
| 7,359,057 B2 | 4/2008 | Schwiesow | |
| 7,397,568 B2 | 7/2008 | Bryce et al. | |
| 7,406,220 B1 | 7/2008 | Christensen et al. | |
| 7,436,494 B1 | 10/2008 | Kennedy et al. | |
| 7,453,552 B1 | 11/2008 | Miesak | |
| 7,532,311 B2 * | 5/2009 | Henderson et al. | 356/4.01 |
| 7,580,132 B2 | 8/2009 | Baillon et al. | |
| 2002/0117340 A1 | 8/2002 | Stettner | |
| 2003/0063884 A1 | 4/2003 | Smith et al. | |
| 2004/0021852 A1 | 2/2004 | DeFlumere | |
| 2004/0119838 A1 | 6/2004 | Griffis et al. | |
| 2004/0130702 A1 | 7/2004 | Jupp et al. | |
| 2004/0213463 A1 * | 10/2004 | Morrison | 382/210 |
| 2005/0052636 A1 | 3/2005 | Lee et al. | |
| 2005/0060092 A1 | 3/2005 | Hablani | |
| 2005/0099634 A1 | 5/2005 | Dubois et al. | |
| 2006/0088946 A1 | 4/2006 | Willson et al. | |
| 2006/0114447 A1 | 6/2006 | Harris et al. | |
| 2006/0132752 A1 | 6/2006 | Kane | |
| 2006/0136172 A1 | 6/2006 | O'Kane et al. | |
| 2006/0197936 A1 | 9/2006 | Liebman et al. | |
| 2007/0073486 A1 | 3/2007 | Tillotson et al. | |
| 2007/0110364 A1 | 5/2007 | Rice et al. | |
| 2007/0115541 A1 | 5/2007 | Rogers et al. | |
| 2007/0122001 A1 | 5/2007 | Wang et al. | |
| 2007/0171407 A1 | 7/2007 | Cole et al. | |
| 2007/0263676 A1 | 11/2007 | Beukema et al. | |
| 2008/0023587 A1 | 1/2008 | Head et al. | |
| 2008/0136626 A1 | 6/2008 | Hudson et al. | |
| 2008/0212328 A1 | 9/2008 | Minano et al. | |
| 2008/0273560 A1 | 11/2008 | Stelmakh | |
| 2008/0290259 A1 | 11/2008 | Mathewson et al. | |
| 2008/0316498 A1 | 12/2008 | Drake et al. | |
| 2009/0002680 A1 | 1/2009 | Ruff et al. | |
| 2009/0046289 A1 | 2/2009 | Caldwell et al. | |
| 2009/0059201 A1 * | 3/2009 | Willner et al. | 356/5.01 |
| 2009/0110267 A1 | 4/2009 | Zakhor et al. | |
| 2009/0115994 A1 | 5/2009 | Stettner et al. | |
| 2009/0142066 A1 | 6/2009 | Leclair et al. | |
| 2009/0237640 A1 | 9/2009 | Krikorian et al. | |
| 2009/0273770 A1 | 11/2009 | Bauhahn et al. | |
| 2009/0310118 A1 | 12/2009 | Halldorsson | |
| 2010/0165323 A1 | 7/2010 | Fiess et al. | |
| 2010/0182587 A1 * | 7/2010 | Fluckiger | 356/4.01 |
| 2012/0044476 A1 | 2/2012 | Earhart et al. | |

FOREIGN PATENT DOCUMENTS

| | | |
|---|---|---|
| GB | 2306828 | 5/1997 |
| GB | 2364840 | 2/2002 |
| WO | WO 01/18563 | 3/2001 |
| WO | WO 02/04982 | 1/2002 |
| WO | WO 02/065155 | 8/2002 |
| WO | WO 2006/130734 | 12/2006 |
| WO | WO 2007/081628 | 7/2007 |
| WO | WO 2009115122 A1 * | 9/2009 |
| WO | WO 2009/133414 | 11/2009 |

OTHER PUBLICATIONS

Restriction Requirement for U.S. Appl. No. 13/341,640, mailed Mar. 7, 2012, 6 pages.

International Search Report and Written Opinion for International Patent Application U.S. Appl. No. PCT/US11/46689, mailed Mar. 20, 2012, 15 pages.

International Preliminary Report on Patentability for International Patent Application Serial No. PCT/US2010/021213, mailed Aug. 4, 2011, 7 pages.

Official Action for U.S. Appl. No. 12/357,251, mailed Mar. 11, 2011, 23 pages.

Xun et al., "Expanding range of pulsed range sensors with active projection from spatial light modulators", Spaceborne Sensors III, Proc. of SPIE vol. 6220, 62200I, 2006, 9 pages.

Notice of Allowance and Fee(s) Due for U.S. Appl. No. 13/043,279, mailed May 16, 2012, 26 pages.

Notice of Allowance and Fee(s) Due for U.S. Appl. No. 12/647,883, mailed Jun. 22, 2012, 13 pages.

Allen et al., "Full-Scale Testing and Platform Stabilization of a Scanning Lidar System for Planetary Landing", *Space Exploration Technologies* (Wolfgang Fink, ed.), Proceedings of SPIE, vol. 6960, pp. 696004-1-696004-10 (2008).

Bakalski et al., "Real Time Processing Enables Fast 3D Imaging at Single Photon Level", Laser Radar Technology and Applications XIII, (Monte D. Turner, Gary W. Kamerman, ed.), Proceedings of the SPIE, vol. 6950, pp. 69500K-1-69500K-9 (2008).

Baker et al., "Advanced Infrared Detectors for Multimode Active and Passive Imaging Applications" *Infrared Technologies and Applications XXXIV* (Bjorn F. Andresen, Gabor F. Fulop, and Paul R. Norton, ed.), Proceedings of the SPIE, vol. 6940, pp. 69402L-1-69402L-11 (2008).

Brady and Schwartz, "ALHAT System Architecture and Operational Concept", Aerospace Conference, 2007 IEEE, Big Sky, MT, IEEEAC Paper # 15700, Version 4, pp. 1-13 (2007).

Cho et al., "Real-Time 3D Ladar Imaging", 35th Applied Imagery and Patern Recognition Workshop, pp. 5 (2006).

Craig et al., "Processing 3D Flash Ladar Point-Clouds in Real-Time for Flight Applications", *Sensors and Systems for Space Applications* (Richard T. Howard and Robert D. Richards, ed.), Proceedings of SPIE, vol. 6555, pp. 65550D-1-65550D-9 (2007).

Dissly et al., "Flash LIDAR Systems for Planetary Exploration", American Astronomical Society, DPS Meeting, Presentation # 40, Ithaca, NY, Bulletin of the American Astronoimical Society, vol. 41, pp. 560 (2008).

Fay et al., "Fusion of Multi-Sensor Pasive and Active 3D Imagery", *Enhanced and Synthetic Vision 2001* (Jacques G. Verly, ed.), Proceedings of SPIE, vol. 4363, pp. 219-230 (2001).

Gillula, "Data Fusion From Multiple Sensors: Real-Time Mapping on an Unmanned Ground Vehicle", 2005 SURF Final Report, California Institute of Technology, 13 pgs (2005).

(56) References Cited

OTHER PUBLICATIONS

Habbit et al., "Utilization of Flash LADAR for Cooperative and Uncooperative Rendezvous and Capture", Space Systems Technology and Operations (Peter Tchoryk, Jr. and James Shoemaker, ed.), Proceedings of SPIE, vol. 5088, pp. 146-157 (2003).

Hyde et al., "Mapping Forest Structure for Wildlife Habitat Analysis Using Multi-Sensor (LiDAR, SAR/InSAR, ETM+, Quickbird) Synergy", Remote Sensing of Environment, vol. 102, pp. 63-73 (2006).

De Lafontaine et al., "LAPS: The Development of a Scanning Lidar System with GNC for Autonomous Hazard Avoidance and Precision Landing"; *Spaceborne Sensors* (Robert D. Habbit, Jr. and Peter Tchoryk, Jr., ed.), Proceedings of SPIE, vol. 5418, pp. 81-93 (2004).

Lamoreux et al., "Relative Navigation Sensor for Autonomous Rendezvous and Docking", *Laser Radar Technology and Applications VIII* (Gary W. Kamerman, ed.), Proceedings of the SPIE, vol. 5086, pp. 317-328 (2003).

Lefsky et al., "Estimates of Forest Canopy Height and Aboveground Biomass Using ICESat", Geophysical Research Letters, vol. 32, L2202, 4 pages. (2005).

Marino and Davis, Jr., "Jigsaw: A Foliage-Penetrating 3D Imaging Laser Radar System"; Lincoln Laboratory Journal, Vol .15, No. 1, pp. 23-36 (2005).

Oberle and Davis, "Toward High Resolution, Ladar-Quality 3-D World Models Using Ladar-Stereo Data Integration and Fusion," Army Research Laboratory, ARL-TR-3407, 37 pgs (2005).

Pack et al., "A Co-Boresighted Synchronized Ladar/EO Imager for Creating 3D Images of Dynamic Scences", *Laser Radar Technology and Applications*, X (Gary W. Kamerman, ed.), Proceedings of SPIE, vol. 5791, pp. 42-50 (2005).

Pierrottet et al., "Characterization of 3-D Imaging Lidar for Hazard Avoidance and Autonomous Landing on the Moon"; *Laser Radar Technology and Applications XII* (Monte D. Turner and Gary W. Kamerman, ed.), Proceedings of SPIE, vol. 6550, pp. 655008-1-655008-9 (2007).

Riris et al., "The Lunar Orbiter Laser Altimeter (LOLA) on NASA's Lunar Reconnaissance Orbirot (LRO) Mission", *Sensors and Systems for Space Applications* (Richard T. Howard and Robert D. Richards, ed.), Proceedings of SPIE, vol. 6555, pp. 655501-1-655501-8 (2007).

Roberts, Jr. and LeVan, "Aperture Sharing Between Low-Background Infrared Sensors and Ladar Sensors", Aerospace Applications Conference, Proceedings of the IEEE, vol. 4, pp. 495-508 (1996).

Smith et al., "Diffractive Optics for Moon Topography Mapping"; *Micro (MEMS) and Nanotechnologies for Space Applications* (Thomas George and Zhong-Yang Cheng, ed.), Proceedings of SPIE, vol. 6223, pp. 622304-1-622304-10 (2006).

Stentz et al., "Real-Time, Multi-Perspective Perception for Unmanned Ground Vehicles", Proceedings of the Association for Unmanned Vehicle Systems International, 15 pgs (2003).

Stettner et al., "Three Dimensional Flash Ladar Focal Planes and Time Dependent Imaging" Advanced Scientific Concepts, Inc., 5 pgs (Undated).

Tan and Narayanan, "Design and Performance of a Multiwavelength Airborne Polarimetric Lidar for Vegetation Remote Sensing"; Journal of Applied Optics, vol. 43, No. 11, pp. 2360-2368 (2004).

Trenkle et al., "3D Sensor Algorithms for Spacecraft Pose Determination", *Spaceborne Sensors III* (Richard T Howard and Robert D. Richards, ed.), Proceedings of SPIE, vol. 6220, pp. 62200D-1-62200D-14 (2006).

Weinberg et al., "Flash Lidar Systems for Hazard Detection, Surface Navigation and Autonomous Rendezvous and Docking", 2007 LEAG Workshop on Enabling Exploration, 2 pgs (2007).

Yoon et al., "High Frequency Attitude Motion of ICESat", *Advances in Astronautical Sciences* (David A. Vollado, Michael J. Gabor and Prasun N. Desai ed.), vol. 120: Spaceflight Mechanics, Part 1, pp. 117-131 (2005).

Robert C. Fenton, "A LADAR-Based Pose Estimation Algorithm for Determining Relative Motion of a Spacecraft for Autonomous Rendezvous and Dock", Master of Science thesis, Utah State University, 90 pages (2008).

Chen et al., "RANSAC-Based DARCES: A New Approach to Fast Automatic Registration of Partially Overlapping Range Images", IEEE Transactions on Pattern Analysis and Machine Intelligence, vol. 21, No. 11, 6 pages (Nov. 1999).

Vasile et al., "Pose-Independent Automatic Target Detection and Recognition Using 3D Laser Radar Imagery", Lincoln Laboratory Journal, vol. 15, No. 1, 18 pages (2005).

Ruel et al., "Field Testing of a 3D Automatic Target Recognition and Pose Estimation Algorithm", Automatic Target Recognition XIV, SPIE vol. 5426, 10 pages (2004).

Allen et al., "Rendezvous Lidar Sensor System for Terminal Rendezvous, Capture, and Berthing to the International Space Station", Sensors and Systems for Space Applications II, SPIE vol. 6958, 8 pp. (2008).

Jasiobedzki at at., "Autonomous Satellite Rendezvous and Docking Using LIDAR and Model Based Vision", Spaceborne Sensors II, SPIE vol. 5798, 12 pages (2005).

Fenton et al., "Simulation Tests of a Lidar-based Spacecraft Pose Determination Algorithm", Sensors and Systems for Space Applications, SPIE vol. 6555, 11 pages (2007).

Ruel at al., "Real-Time 3D Vision Solution for On-Orbit Autonomous Rendezvous & Docking", Spaceborne Sensors III, SPIE 6220, 11 pages (2006).

Trenkle at al., "3-D Sensor Algorithms for Spacecraft Pose Determination", Spaceborne Sensors III, SPIE vol. 6220, 14 pages (2006).

Wikipedia, "RANSAC", available at http://en.wikipedia.org/wiki/RANSAC, 5 pages (2009).

Brian F. Aull at al., "Geiger-Mode Avalanche Photodiodes for Three-Dimensional Imaging", Lincoln Laboratory Journal, vol. 13, No. 2 (2002).

Didier Bruneau, "Mach-Zehnder Interferometer as a Spectral Analyzer for Molecular Doppler Wind Lidar", Applied Optics, vol. 40, No. 3, pp. 391-399 (2001).

Didier Bruneau and Jacques Pelon, "Simulation and Measurement of Particle Backscattering & Extinction Coefficient & Wind Velocity by Lidar with a Mach-Zehnder Interferometer: Principle of Operation & Performance Assessment", Applied Optics, vol. 42, No. 6, pp. 1101-1114 (2003).

Pierre Connes and Guy Michel, "Astronomical Fourier Spectrometer", Applied Optics, vol. 14, No. 9, pp. 2067-2084 (1975).

Degnan, John J., "Photon-Counting Multikilohertz Microlaser Altimeters for Airborne and Spaceborne Topographic Measurements", Journal of Geodynamics, vol. 34, pp. 503-549 (2002).

T.S. Durrani and C.A. Greated, "Spectral Analysis and Cross-Correlation Techniques for Photon Counting Measurements on Fluid Flows", Applied Optics, vol. 14, No. 3, pp. 778-794 (1975).

W.A. Gault, et al., "ERWIN: An E-Region Wind Interferometer", Applied Optics, vol. 35, No. 16, pp. 2913-2922 (1996).

Gentry, Bruce et al., "The Tropospheric Wind Lidar Technology Experiment (TWiLiTE): An Airborne Direct Detection Doppler Lidar Instrument Development Program", available at http://esto.nasa.gov/conferences/estc2006/papers/b8p2.pdf.

Pierre Jacquinot, "*The Luminosity of Spectrometers with Prisms, Gratings, or Fabry-Perot Etalons*", Journal of the Optical Society of America, vol. 44, No. 10, pp. 761-765 (1954).

V. Nirmal Kumar and D. Narayana Rao, "*Determination of the Instrument Function of a Grating Spectrometer by Using White-Light Interferometry*", Applied Optics, vol. 36, No. 19, pp. 4535-4539 (1997).

Lieber, Mike et al., "Development of a Validated End-to-End Model for Space-Based Lidar Systems", *Lidar Remote Sensing for Environmental Monitoring VIII* (Singh, Upendra N. ed.), Proceedings of the SPIE, vol. 6681, 66810F (2007).

Lieber, Mike et al., "System Verification of the JMEX Mission Residual Motion Requirements with Integrated Modeling", *UV/Optical/IR Space Telescopes: Innovative Technologies and Concepts II* (MacEwen, Howard a. ed.), Proceedings of the SPIE, vol. 5899, 589901, pp. 1-12 (2005).

(56) References Cited

OTHER PUBLICATIONS

Lieber, Mike et al., "Integrated System Modeling for Evaluating the Coronagraph Approach to Plant Detection", *High-Contrast Imaging for Exo-Planet Detection* (Schultz, Alfred B. ed.), Proceedings of the SPIE, vol. 4860 (2002). (Abstract only).
W.T. Mayo, Jr., "Photon Counting Processor for Laser Velocimetry", Applied Optics, vol. 16, No. 5, pp. 1157-1162 (1977).
G.A. Morton, "Photon Counting", Applied Optics, vol. 7, No. 1, pp. 1-10 (1968).
Rabinovich, W.S. et al., "45 Mbps Cat's Eye Modulating Retro-Reflector Link Over 7 Km", *Free-Space Laser Communications VI*, Proceedings of the SPIE, vol. 6304, pp. 63040Q (2006). (Abstract only).
Robert L. Richardson and Peter R. Griffiths, "Design and Performance Considerations of Cat's Eye Retroreflectors for Use in Open-Path Fourier-Transform-Infrared Spectrometry", Applied Optics, vol. 41, No. 30, pp. 6332-6340 (2002).
J. Ring and J.W. Schofield, "Field-Compensated Michelson Spectrometers", Applied Optics, vol. 11, No. 3, pp. 507-516 (1972).
Gordon G. Shepherd et al., "WAMDII: Wide-Angle Michelson Doppler Imaging Interferometer for Spacelab", Applied Optics, vol. 24, No. 11, pp. 1571-1584 (1985).
Gordon G. Shepherd et al., "WINDII—The Wind Imaging Interferometer for the Upper Atmosphere Research Satellite", Geophys. Res. vol. 98, No. D6, pp. 10,725-10,750 (1993).
Vallerga, John et al., "Noiseless, High Frame Rate (>KHz), Photon Counting Arrays for Use in the Optical to the Extreme UV", University of California, Berkeley—Sciences Laboratory and University of Geneva, Switzerland, available at http://www.ssl.berkeley.edu/~mcphate/AO/ao_medipix.html (2004-present).
Shiquang Wang, Gordon G. Sheperd, and William E. Ward, "Optimized Reflective Wide-Angle Michelson Phase-Stepping Interferometer", Applied Optics, vol. 39, No. 28, pp. 5147-5160, (2000).
Grund, et al. "Enabling Characteristics of Optical Autocovariance Lidar for Global Wind and Aerosol Profiling", AGU, American Geophysical Union, Fall Meeting, San Francisco, CA (Dec. 16, 2008).
Grund, Chris, "An Alternative Direct Detection Approach to Doppler Winds that is Independent of Aerosol Mixing Ratio and Transmitter Frequency Jitter", Space Winds Lidar Working Group, Miami, FL (Feb. 8, 2007).
Grund, Christian et al., "Optical Autocovariance Wind Lidar and Performance from LEO", 14th Coherent Laser Radar Conference, Snowmass, CO (Jul. 7, 2007).
Grund, Christian et al., "Supporting NOAA and NASA High-Performance Space-Based DWL Measurement Objectives with a Minimum Cost, Mass, Power, and Risk Approach Employing Optical Autocovariance Wind Lidar (OAWL)", Space Winds Lidar Working Group, Monterrey, CA (Feb. 6, 2008).
Grund, Christian, et al., Presentation Entitled "Simultaneous Profiling of Aerosol Optical Properties, Gas Chemistry, and Winds with Optical Autocovariance Lidar", 24th ILRC Conference (Jun. 23, 2008).
Chris Grund, "Lidar Wind Profiling from Geostationary Orbit Using Imaging Optical Autocovariance Interferometry", Space Winds Lidar Working Group, Snowmass, CO (Jul. 17, 2007).
Grund, et al,, Poster and Paper Entitled "Optical Autocovariance Wind Lidar (OAWL) for Efficient Space-Based Direct-Detection High-Resolution Aerosol Backscatter Winds", International Laser Radar Conference, Boulder, CO (Jun. 24, 2008).
Grund et al., Poster Entitled "Optical Autocovariance Wind Lidar (OAWL) for Efficient Space-Based Direct-Detection High-Resolution Aerosol Backscatter Winds", presented at the Coherent Laser Radar Conference, Jul. 2007, presented at the Working Group on Space-based Lidar Winds, Feb. 2008, and presented at the International Laser Radar Conference, Boulder, CO, Jun. 23-27, 2008, 1 page.

Grund, Christian J., Power Point Presentation Entitled "Optical Autocovariance: Alternative Direct Detection Approach to Doppler Winds that is Independent of Aerosol Mixing Ratio and Transmitter Frequency Jitter", presented at the Working Group Conference on Space-Based Lidar Winds, Feb. 6-9, 2007, 12 pages.
Grund et al., Presentation Entitled "Optical Autocovariance Wind Lidar and Performance from LEO", presented at the Coherent Laser Radar Conference, Jul. 11, 2007, 30 pages.
Grund et al. "Simultaneous Profiling of Aerosol Optical Properties, Gas Chemistry, and Winds with Optical Autocovariance Lidar", Paper 1 of 2 presented at the 24th International Laser Radar Conference, Jun. 23-27, 2008, 5 pages.
Grund et al., "Optical Autocovariance Wind Lidar (OAWL) for Efficient Space-Based Direct-Detection High-Resolution Aerosol Backscatter Winds", Paper 2 of 2 presented at the 24th International Laser Radar Conference, Jun. 23-27, 2008, 5 pages.
Kasten, et al., "Fabrication and Characterization of Individually Addressable Vertical-Cavity Surface-Emitting Laser Arrays and Integrated VCSEL/PIN Detector Arrays", Proceedings of SPIE, vol. 6484, 64840C, 2007.
Aerius Photonics website, "Aerius NIR/SWIR Illuminators" product sheet, available at http://www.aeriusphotonics.com/datasheets.html, 2 pages (2009).
U.S. Appl. No. 12/464,009, filed May 11, 2009.
U.S. Appl. No. 12/357,251, filed Jan. 21, 2009.
U.S. Appl. No. 12/647,883, filed Dec. 28, 2009.
BMW Corporate Communications Press Release, "BMW Develops Laser Light for the Car", Sep. 1, 2011, The BMW Group, 3 pages.
Notice of Allowance and Fee(s) Due for U.S. Appl. No. 12/390,226, mailed Dec. 17, 2010, 23 pages.
Notice of Allowance and Fee(s) Due for U.S. Appl. No. 12/357,171, mailed Dec. 6, 2011, 32 pages.
International Search Report and Written Opinion for International Application No. PCT/US2010/033559, mailed Jul. 6, 2010, 9 pages.
International Preliminary Report on Patentability for International Application No. PCT/US2010/033559, mailed Nov. 24, 2011, 8 pages.
Aull et al., "Geiger-Mode Avalanche Photodiodes for Three-Dimensional Imaging", Lincoln Laboratory Journal, vol. 13, No. 2 (2002).
Boldt et al., "A Handheld Texel Camera for Acquiring Near-Instantaneous 3D Images," Conference Record of the Forty-First Asilomar Conference on Signals, Systems & Computers, Nov. 4, 2007, pp. 953-957.
Ledebuhr et al., "Micro-Satellite Ground Test Vehicle for Proximity and Docking Operations Development," Aerospace Conference, Mar. 10-17, 2001, IEEE Proceedings, Jan. 1, 2001, vol. 5, pp. 2493-2504.
Ruel et al., "Real-Time 3D Vision Solution for On-Orbit Autonomous Rendezvous & Docking", Spaceborne Sensors III, SPIE 6220, 11 pages (2006).
Stettner et al., "Three Dimensional Flash Ladar Focal Planes and Time Dependent Imaging," International Symposium on spectral Sensing Research, May 31, 2006, retrieved at www.advancedscientificconcepts.com/technology/documents/ThreeDimensionalFlashLabdarFocalPlanes-ISSSRPaper.pdf, 5 pages.
International Search Report and Written Opinion for International Patent Application Serial No. PCT/US2010/021213, mailed Mar. 22, 2010, 8 pages.
Official Action for U.S. Appl. No. 12/464,009, mailed Aug. 4, 2010, 25 pages.
Response to Office Action for U.S. Appl. No. 12/464,009, filed Nov. 3, 2010, 5 pages.
Amendment After Allowance for U.S. Appl. No. 12/464,009, filed Feb. 15, 2011, 6 pages.
Extended European Search Report for European Patent Application No. 10775273.5, dated Oct. 4, 2012, 10 pages.
International Preliminary Report for Interntional (PCT) Patent Application No. PCT/US2011/046689, mailed Feb. 28, 2013, 12 pages.
"Flash LIDAR Technology Shows Promise for Vegetation Canopy Science Measurements," NASA Earth Science and Technology Office, 2009, 2 pages.

(56) References Cited

OTHER PUBLICATIONS

Abdalati et al., Report of the Ad-Hoc Science Definition Team for the Ice Cloud and Land Elevation Satellite-II (ICESAT-II), 2008, 69 pages.

Coyle et al., "The High Output Maximum Efficiency Resonator (HOMER) Developed for Long Life, Space-Based Altimetry," IEEE Aerospace Conference, 2006, 7 pages.

Shugart et al., "Determination of Stand Properties in Boreal and Temperate Forests Using High-Resolution Imagery," Forest Science, 2000, vol. 46, No. 4, pp. 478-486.

Weimer et al., "Seeing the Forest and the Trees: An electronically steerable flash LiDAR improves vegetation studies," Earth Imaging Journal, 2009, pp. 33-34.

Weishampel et al., "Semivariograms from a forest transect gap model compared with remotely sensed data," Journal of Vegetation Science, 1992, vol. 3, Iss. 4, pp. 521-523 (Abstract only).

Official Action for European Patent Application No. 10775273.5 dated Jun. 20, 2013, 5 pages.

Official Action for U.S. Appl. No. 13/099,118 mailed Aug. 29, 2013, 6 pages.

Notice of Allowance and Fee(s) Due for U.S. Appl. No. 12/357,251, mailed Sep. 13, 2011, 11 pages.

\* cited by examiner

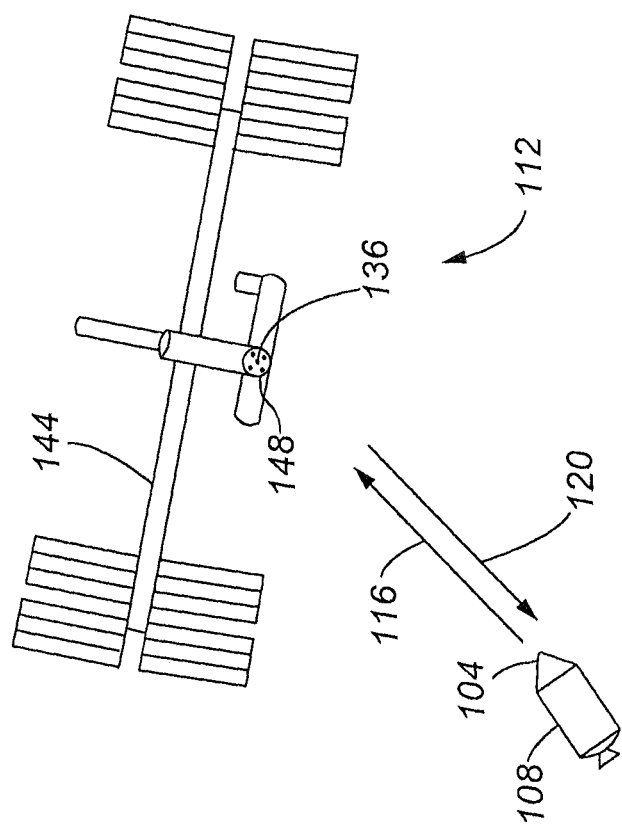

ELECTRONICALLY STEERED FLASH LIDAR

FIELD

An electronically steered flash LIDAR is disclosed. More particularly, electronically steered flash LIDAR systems and methods in which illumination within a scene is adaptively controlled are provided.

BACKGROUND

LIDAR systems have been proposed for use in connection with various applications. For example, NASA and the scientific community have been working towards a space mission to characterize vegetation, specifically vegetation canopy. Data obtained from this mission would assist in trying to close the Earth's carbon budget as well as give a global baseline to vegetation health. In addition, LIDARs have been used in connection with altimetry and target identification. Other applications in space include rendezvous and docking, robotic rovers, planetary mapping, terrain relative navigation for future landers, and long range target position and range tracking.

An along track vegetation LIDAR design preferably has continuous coverage by the laser and a 25 meter footprint. For a LIDAR carried by a satellite, this drives a laser repetition rate of approximately 250 Hz. This is a relatively high repetition rate, and has a significant impact on laser reliability because of the high number of laser shots required for the mission (e.g., 10 billion). The high repetition rate also means that, in order to keep the average output power reasonable to improve laser reliability, the peak power per shot must be kept relatively low (e.g., 15 mJ). Accordingly, such a system may have insufficient power to make measurements through clouds and heavy aerosol layers.

A common issue for imaging LIDARs is that, in contrast to traditional imaging cameras, LIDARs must carry their own light source. Moreover, the performance and size/weight/power of imaging LIDARs are strongly dependent on the amount of laser light they produce. Trying to illuminate large scenes with laser light is challenging, especially at long distances. Any light that is collected and that falls below the detection threshold for a pixel is lost. Any light that misses the target is lost. This means that the laser light (photons) is of high value, and system designs must use the light as efficiently as possible.

One limitation of staring LIDARs has been their small cross track coverage. In particular, covering a large across-track swath on the ground using a staring LIDAR approach with multiple lasers is prohibitive in terms of available electrical power in space. In addition, LIDARs require that the transmitted laser spot be well within the receiver field of view over the target area. Large fields of view per detector are not desirable because a wide field of view results in the acceptance of more background light than a narrower field of view, reducing the signal to noise ratio. Within the field of view, the goal for good daytime performance has been to have the laser spot size only slightly smaller than the receiver's instantaneous field of view. This requires accurate boresighting of the LIDAR instrument. However, mechanical boresight mechanisms can be heavy and are expensive to produce and test.

In order to match laser illumination in a LIDAR to mission requirements, complex laser transmitter optics that shape or form the beam into patterns, or mechanical scanning systems, have been proposed. For example, in some mission scenarios, it may be desirable to attenuate the illumination signal, for example where a reflective target has entered the field of view of the LIDAR. As another example, widening of an illumination beam may be desirable when a LIDAR system used in connection with a landing system switches from an altimetry mode to a terrain relative navigation mode, and then to a hazard avoidance mode. Accordingly, attenuation and/or diffusion devices that can be selectively switched into or out of the illumination beam have been developed. However, such mechanisms typically result in the wastage of photons in at least some configurations, and introduce elements that can be subject to mechanical failure and/or misalignment. These systems also have the effect of shifting the effective dynamic range of the overall detector, rather than broadening that dynamic range.

SUMMARY

As can be appreciated by one of skill in the art, a LADAR is a laser detection and ranging system. As can also be appreciated by one of skill in the art, a LIDAR or light detection and ranging system is essentially equivalent to a LADAR system. In particular, both LADAR and LIDAR systems use a pulsed light source to produce light that is reflected from a target to obtain range information. Moreover, the term LADAR is commonly used in connection with systems having defense applications, while the term LIDAR is commonly used in connection with civilian applications. However, in the present description, no distinction between the terms is made. Therefore, for ease of description and consistency, the term LIDAR is used throughout this description. However, it should be understood that the term LIDAR is also intended to encompass LADAR, to the extent that a distinction between the terms might otherwise be drawn.

In accordance with embodiments of the present invention, adaptive LIDAR systems and methods are provided in which the illumination of a scene is controlled. More particularly, the scene is illuminated by a number of beams. These beams can be discrete such that they illuminate separate areas of a scene, or can be combined so as to form an arbitrary beam shape. Aspects of the beams used to illuminate the scene, such as the relative intensity and angular spacing between beams, are controlled in response to feedback received from a multiple element detector or from a plurality of single element detectors. More particularly, the number of beams incident on the scene, the location within the scene on which a particular beam is incident, the intensity of the beams, and whether a beam is within an imaged area of the scene can be controlled. Moreover, in accordance with embodiments of the present invention, the beams may be controlled in a manner that allows for a variety of different beam patterns and/or illumination patterns to be produced from frame to frame. In accordance with other embodiments, the beam may be controlled in a manner that is essentially "random access", as opposed to prior systems that provide for scanning of an illuminating beam. In accordance with still other embodiments, the beam may comprise an arbitrary non-discrete beam pattern.

A LIDAR system in accordance with embodiments of the present invention may include a laser, a laser array, or other light source. Moreover, the light source may provide its output to an electronic beam steering or beam forming device. The lidar system may further include a controller that operates the laser and the beam forming device. Light emitted from the LIDAR system may be directed such that it illuminates a target scene or region. A detector comprising a multiple element or multiple pixel receiver is provided for detecting laser light reflected from the target region. As an example, the detector may comprise a focal plane array. Information regarding the intensity of light received at individual pixels of the focal plane array can be provided to the controller. In accordance with still other embodiments of the present invention, information regarding the range from the LIDAR system to elements within the scene can be determined. In response to this intensity and/or range information, the controller can function to alter one or more aspects of the light illuminating the scene. That is, the system adapts the illumination to the scene. This alteration of the light illuminating the scene can include controlling aspects of the illuminating light, such as the relative intensity and angular spacing between beams comprising the illumination light, so that different areas of the scene are illuminated differently. In accordance with still other embodiments of the present invention, a light source other than a laser can be used to illuminate the scene. In accordance with further embodiments of the present invention, a range determination need not be part of the operation of the system. Instead, embodiments of the present invention can adapt illumination light based on the intensity of the collected light on each pixel without also obtaining range information.

Methods in accordance with embodiments of the present invention include illuminating a scene with illumination light comprising one or more controlled beams of light. The method further includes detecting light reflected from the illuminated scene using a multiple pixel detector. Based on information regarding the intensity of the signal returned to different pixels of the multiple pixel detector, characteristics of the light used to illuminate the scene are changed. More particularly, the light used to illuminate the scene can be varied from frame to frame so that different areas within the scene are provided with different levels of illumination. In accordance with further embodiments of the present invention, characteristics such as the number, location, and intensity of beams incident on the scene can be varied from frame to frame.

Additional features and advantages of embodiments of the present invention will become more readily apparent from the following description, particularly when taken together with the accompanying drawings.

BRIEF DESCRIPTION OF THE DRAWINGS

FIGS. 1A-1D depict flash LIDAR systems in accordance with embodiments of the present invention, in exemplary operating environments.

DETAILED DESCRIPTION

Figure 1A:
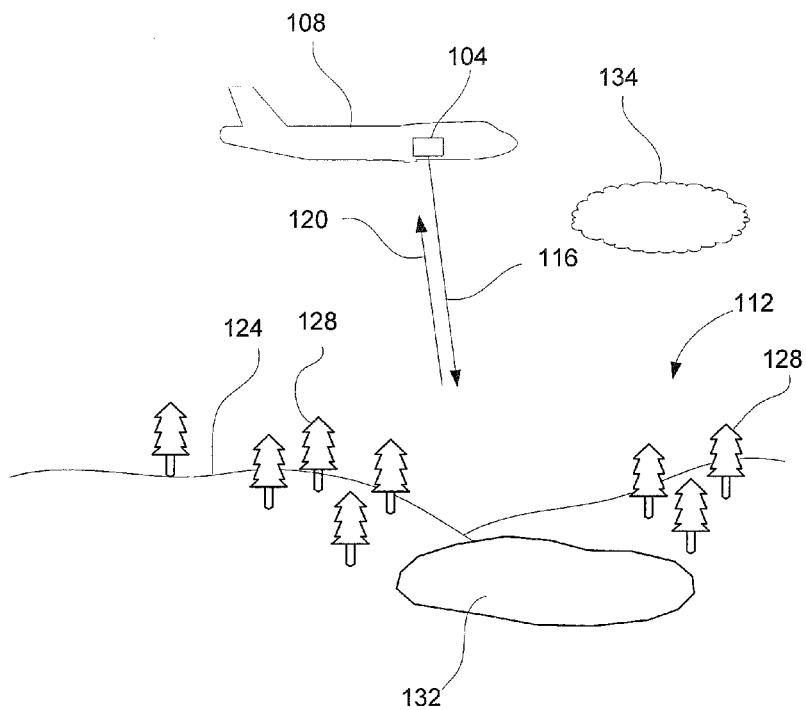

FIG. 1A illustrates an illumination system or a LIDAR system 104 in accordance with embodiments of the present invention in an exemplary operating environment. Although the illumination system 104 is generally referred to herein as a LIDAR system 104, at least some embodiments of the present invention provide selective illumination of a scene, without providing range information. Therefore, it should be appreciated that not all embodiments of the disclosed invention require that the illumination system 104 comprise a LIDAR system. Moreover, although at least some embodiments include a flash type LIDAR system 104, not all embodiments of the disclosed invention require the collection of image information, or the inclusion of an imaging detector.

Figure 2A:
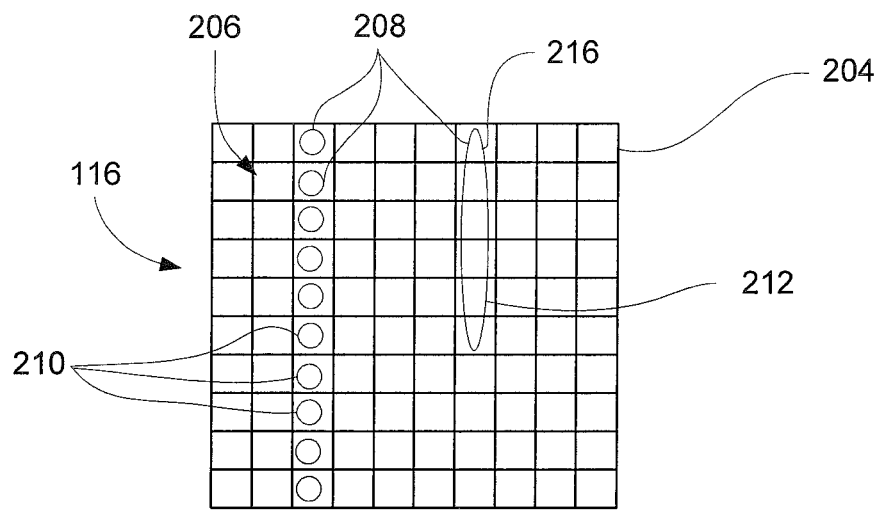
FIGS. 2A-2L depict exemplary illumination patterns in accordance with embodiments of the present invention.

The illumination or LIDAR system 104 is mounted to a platform 108. In this example, the platform 108 is an airplane, however, other platforms 108 may be associated with the LIDAR system 104. Examples of other platforms include satellites, helicopters, unmanned aerial vehicles, autonomous rovers, balloons, stationary supports, or spacecraft. The platform 108 is used to place the LIDAR 104 in a location from which a survey area or target region or scene 112 is observed. More particularly, the LIDAR 104, when in a desired position with respect to the scene 112, is operated to output illumination light 116 to illuminate the scene 112 or portions or areas within the scene 112. Reflected light 120 is returned from the scene 112, and is detected by the LIDAR system 104. Information regarding the time of flight of light is used to obtain range information. As shown in this example, a LIDAR system 104 in accordance with embodiments of the present invention may be operated to map or survey ground features 124, vegetation canopy 128, or other features, such as bodies of water 132. As can be appreciated by one of skill in the art, different elements within a scene 112 will reflect the illumination light 116 differently. For example, a terrain feature 124 comprising a hillside may reflect the illumination light 116 less efficiently than the leaf of a tree included in the vegetation canopy 128. As another example, ice, a lake, or other body of water 132 may reflect the illumination light 116 more intensely than the vegetation canopy 128. The same can be true for different soils, minerals and regolith. In addition, if a cloud 134 intersects the illumination light 116 and/or the reflected light 120, the intensity of the signal received at the LIDAR system 104 will be blocked or attenuated. An example illumination pattern that may be output by the LIDAR system 104 in the exemplary operating environment of FIG. 1A is illustrated in FIG. 2A. The intensity of reflected light detected also depends on the distance from the camera to the scene for non-specular surfaces. This is seen in flash cameras where the foreground saturates and the background is not observed. As described herein, the inter-scene illumination can be adjusted to compensate for these differences by measuring the intensity of the returned light.

Figure 2B:
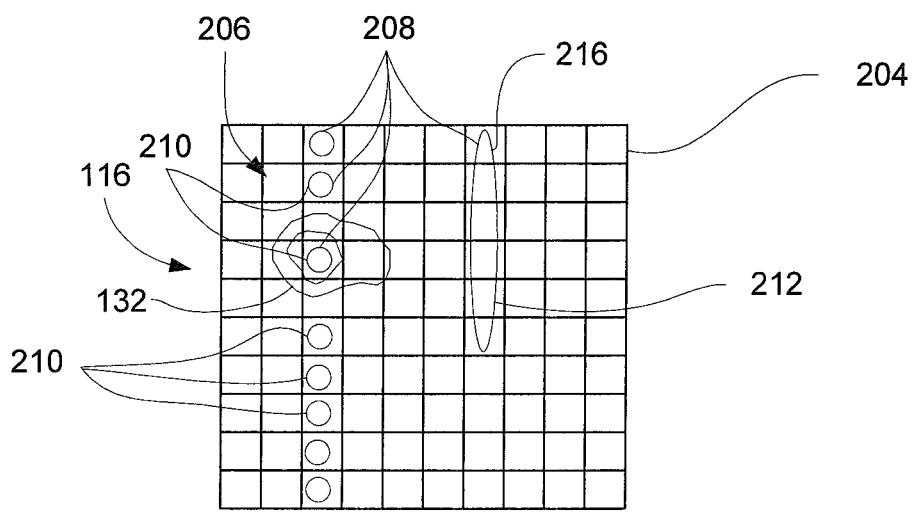

More particularly, FIG. 2A illustrates a field of view 204 of a LIDAR system 104, and illumination light 116 that is controlled to form an illumination pattern 206. In this example, the illumination pattern 206 includes a plurality of beams 208, and is representative of a pattern 206 that can be applied in connection with an along track vegetation survey, where the illumination pattern 206 shown in the figure is moved across the scene from left to right. The example pattern 206 includes ten deflected or steered beams 210 arranged in a column, and an undeflected beam 212. In addition, this exemplary pattern 206 includes an undeflected beam 212 comprising a shaped beam 216. Alternatively or in addition, a shaped beam 216 can be formed from one or more deflected beams 210. As can be appreciated by one of skill in the art, the shaped beam 216 covers an area within the field of view 204 of the LIDAR system 104 corresponding to a plurality of pixels of the LIDAR system's 104 detector. In addition, individual beams 208 can be directed to cover an area corresponding to a single pixel of the detector, or multiple pixels of the detector. Moreover, individual beams do not have to look discrete on the focal plane. For example, they can blend together to form a line or other contiguous shape. In accordance with still other embodiments of the present invention, at least some of the beams 208 may comprise selectively activated or controlled beams. An example illumination pattern 206 that may be output by a LIDAR system 104 in the exemplary operating environment of FIG. 1A, that, in accordance with embodiments of the present invention, takes into account the strength of the return signal received from different features within the field of view 204 of the LIDAR system 104 in response to the illumination pattern 206 of FIG. 1A is illustrated in FIG. 2B. In this example, there are two less beams 208 than in the example of FIG. 2A, to account for the intensity of a reflected signal 120 in the vicinity of a particularly reflective feature, such as a body of water 132. Specifically, the pattern 206 of the incident light 116 output by the LIDAR system 104 has been adapted or controlled so that the number of deflected beams 210 incident on the body of water 132 in this later frame has been reduced as compared to the pattern shown in FIG. 2A.

Figure 1B:
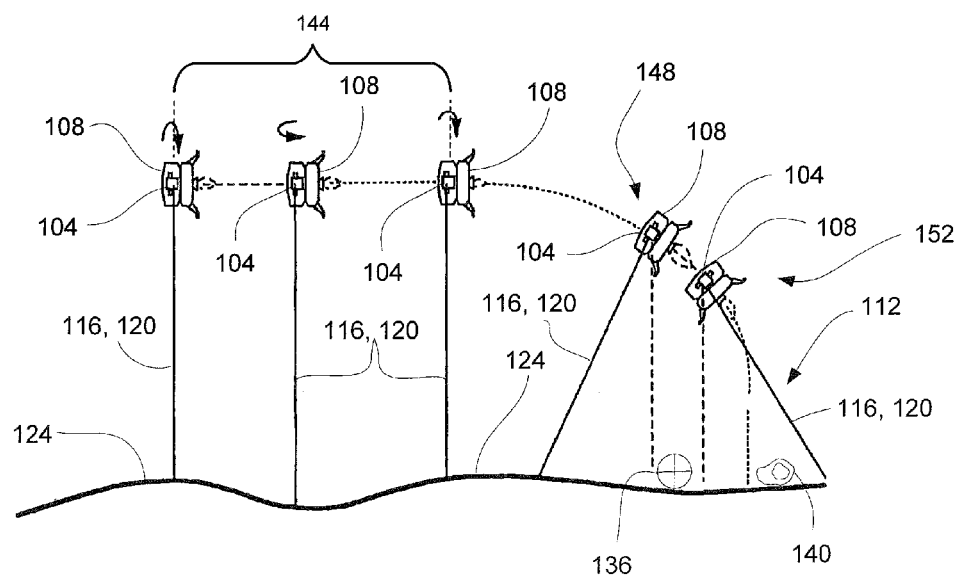

With reference now to FIG. 1B, a LIDAR system 104 in accordance with embodiments of the present invention is illustrated in another exemplary operating environment. In this example, the platform 108 comprises a spacecraft, and more particularly, a landing craft. The LIDAR 104 is used in this scenario in a number of different modes, as the landing craft approaches a scene 112 comprising a landing zone, and as the landing craft lands within the landing zone. As can be appreciated by one of skill in the art, during different portions of the approach and landing sequence, it can be desirable to control the illumination light 116 of the LIDAR system 104 so that the illumination light 116 is used most effectively. For example, during an initial phase 144, which for example may comprise a transfer orbit phase, it may be desirable to concentrate the illumination light 116 into a relatively small number of beams 208, or even a single beam 208. Doing so can increase the intensity of the individual deflected beams 210, increasing the number of photons received from the illuminated area of the scene 112 as part of the reflected light 120. This concentration of illumination light 116 is particularly useful when the LIDAR system 104 is at a relatively long range from the surface or other ground features 124 and when the LIDAR system 104 is operated in altimeter, terrain relative navigation, or other modes in which the LIDAR system 104 is at a relatively long range from the scene 112, and/or in which image information is relatively unimportant. Example illumination patterns 206 that may comprise illumination light 116 output during the initial phase 144 are illustrated in FIGS. 2C and 2D.

Figure 2C:
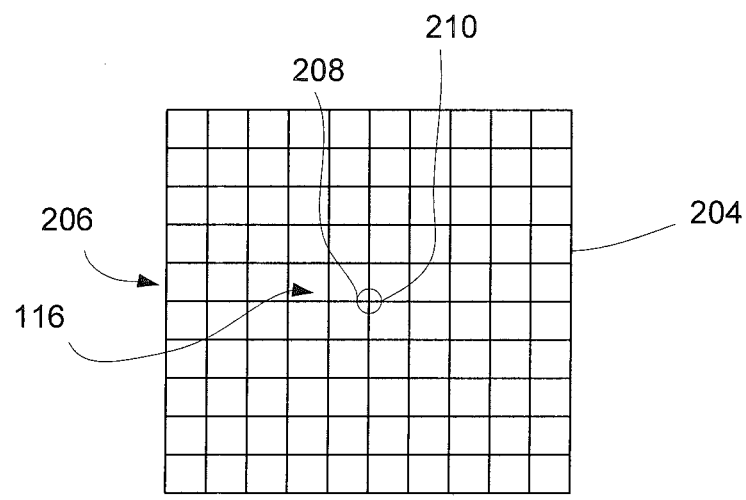
Figure 2D:
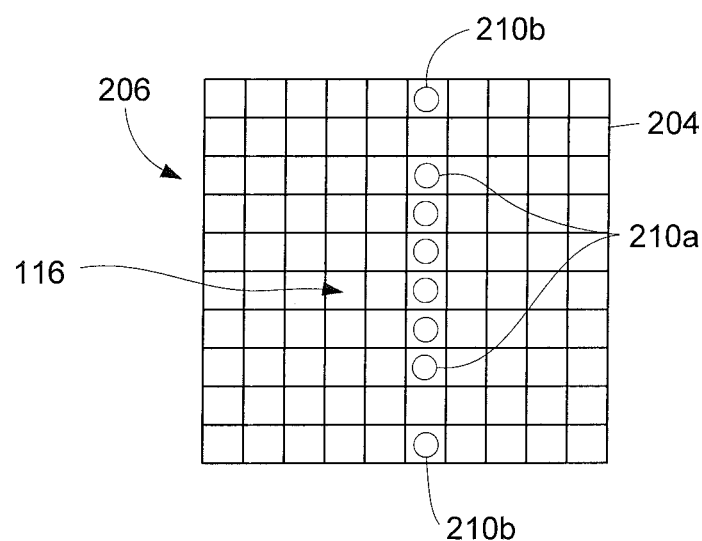

FIG. 2C illustrates an illumination pattern 206 that is particularly useful when the LIDAR system 104 is at a relatively long range from the surface 124. In this configuration, the illumination light 116 may comprise a single deflected beam 210 within the field of view 204 of the LIDAR system 104. The single deflected beam 210 can spread over an area corresponding to one or multiple pixels of the detector. In FIG. 2D, the illumination light 116 is in a pattern 206 that includes beams 208 arranged in an across track pattern. These beams 208 can comprise deflected or steered beams 210. More particularly, the pattern 206 in this example includes a plurality of closely spaced deflected beams 210a in an across track configuration to form an essentially contiguous area of coverage at the center of the pattern 206, and with non-contiguous or spaced apart deflected beams 210b on either side of the center of the pattern. These types of patterns could be used to efficiently perform terrain relative navigation.

Figure 2E:
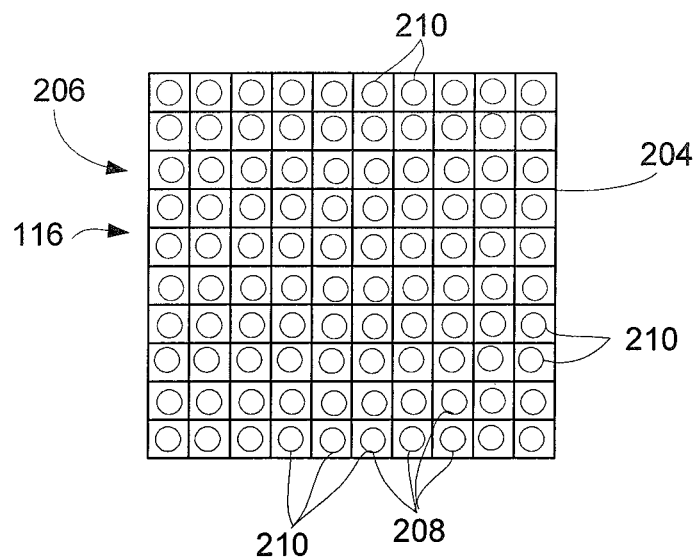
Figure 2F:
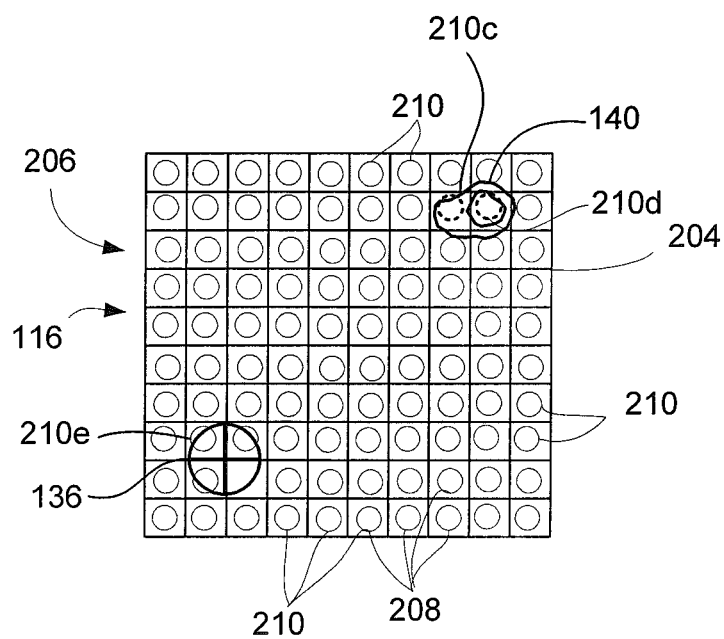

With reference again to FIG. 1B, during an approach phase 148, imaging information may become relatively more important. In accordance with embodiments of the present invention, the illumination light 116 desirably covers relatively more of the field of view of the LIDAR system 104. Accordingly, the illumination light 116 may be controlled such that the illumination light 116 is distributed about the field of view of the LIDAR system 104. As can be appreciated by one of skill in the art, certain objects within the field of view of a LIDAR system 104 may be more reflective than others. For example, a target scene 112 comprising a landing zone or a docking assembly might be associated with reflective targets 136 that have been placed to assist the LIDAR system 104, human observers, and/or other systems in determining the position of the platform 108 relative to the target scene 112. As another example, natural features, such as rocks 140, ice, or light colored soils, may be more reflective than the surrounding terrain 124. As a result, the reflected light 120 may include areas in which the reflected signal is so intense the pixels in the corresponding area of the LIDAR system 104 detector are saturated. Even if such areas of the LIDAR system 104 detector are not saturated, because of the relative efficiency with which more reflective objects 136, 140 return light to the LIDAR system 104, the intensity of the illumination light 116 in areas of the scene 112 corresponding to such objects 136, 140 could usefully be decreased. Moreover, for LIDAR systems 104 utilizing deflected beams 210, decreasing the illumination light 116 in such areas allows the illumination light 116 to be redeployed to other areas within the scene 112. Alternatively or in addition, decreasing the illumination light 116 in at least some areas of a scene 112 can result in a decrease in the power required to produce the illumination light 116, and/or can allow the intensity of beams 208 incident on other areas of the scene 112 to be increased. An exemplary illumination pattern 206 of illumination light 116 applicable during an approach phase is illustrated in FIG. 2E. An exemplary illumination pattern 206 during an approach phase, with modifications to reduce the illumination of reflective features 136, 140, is illustrated in FIG. 2F.

More particularly, in FIG. 2E, the illumination light 116 features deflected beams 210 that are evenly distributed about the field of view 204 of the LIDAR system 104. Accordingly, the LIDAR system 104 may operate as an imaging type LIDAR system 104. In FIG. 2F, deflected beams 210c and 210d are attenuated as compared to the other beams 208 of the illumination pattern 116, to account for the greater reflectivity of the rock 140 in the area of the field of view 204 illuminated by deflected beams 210c and 210d. In accordance with embodiments of the present invention in which an acoustic-optic modulator is used to form the illumination pattern 216, attenuation of beams 210 can be accomplished by supplying reduced radio-frequency energy associated with the steering of the attenuated beams 210 as compared to non-attenuated beams 210, as described elsewhere herein. In the area of the field of view 204 corresponding to the target 136, only one deflected beam 210e is incident on the target 136, while the beam that would otherwise fall in the opposite quadrant of the target 136 according to the illumination pattern 116 has been turned off, to account for the intensity of the light reflected by the target 136.

Figure 2G:
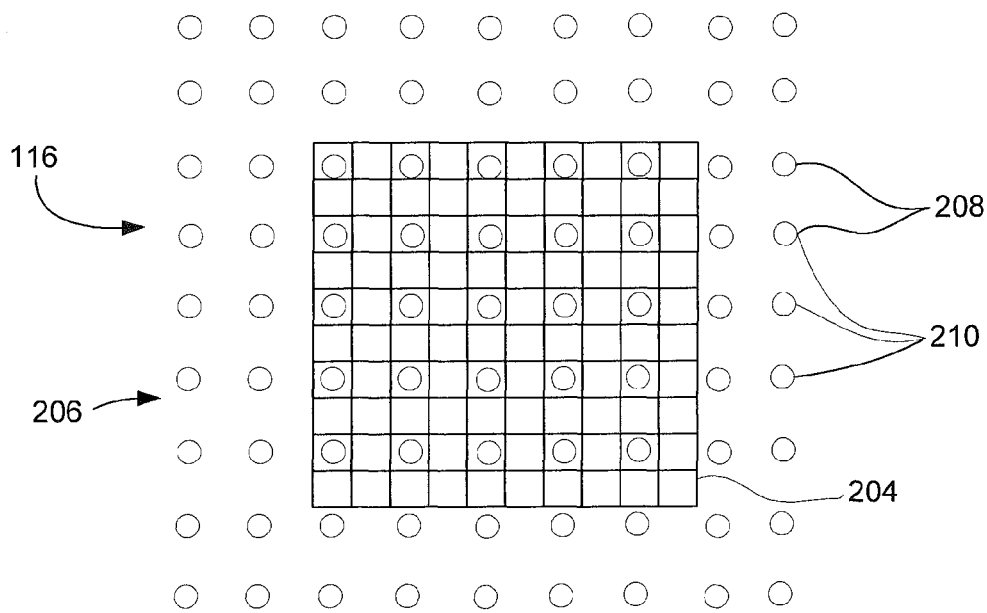
Figure 2H:
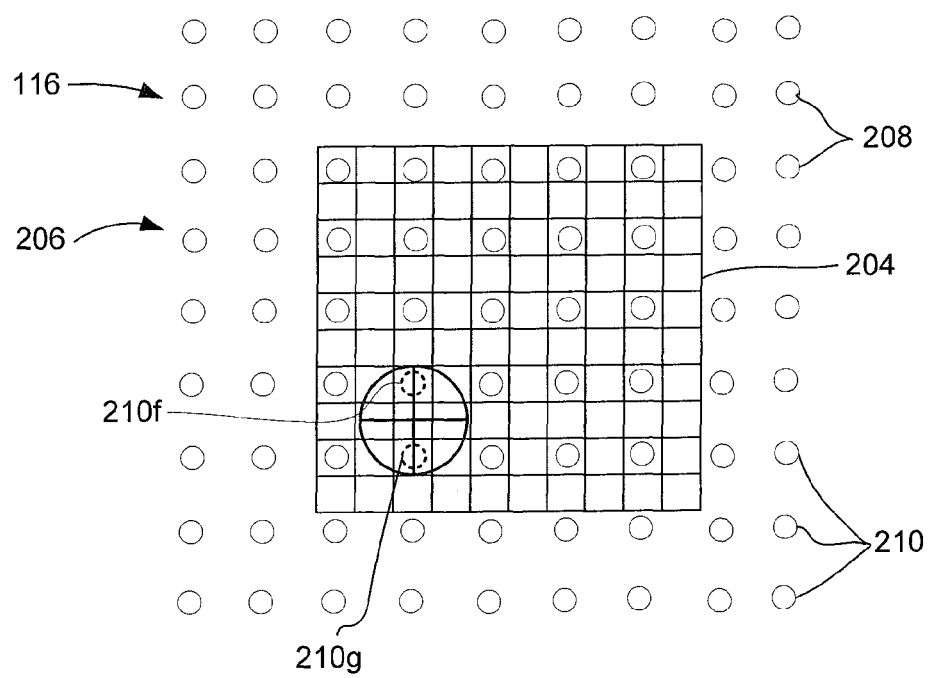

With reference again to FIG. 1B, during a terminal phase 152, the illumination light 116 may need to be attenuated generally, in order to avoid saturating the LIDAR system 104 detector. In accordance with embodiments of the present invention, this can be achieved by steering individual beams provided as illumination light 116 to areas outside of the field of view of the LIDAR system 104. Alternatively or in addition, at least some of the beams 208 comprising the illumination light 116 can be turned off, and/or the intensity of at least some of the beams 208 comprising the illumination light 116 can be attenuated or reduced. An exemplary illumination pattern 206 that may be used in a terminal phase 152 of a landing or docking scenario is illustrated in FIG. 2G. An exemplary illumination pattern 206 during a terminal phase 152, with attenuation of deflected beams 210 in areas corresponding to reflective targets 136 and 140 is illustrated in FIG. 2H.

In particular, in FIG. 2G, the pattern illumination 206 features deflected beams 210 that have been spaced so that at least some of the deflected beams 210 fall outside of the field of view 204 of the LIDAR system 104. Accordingly, less of the illumination light 116 is received as reflected light 120 at the detector of the LIDAR system 104. In FIG. 2H, the illumination light 116 includes deflected beams 210f and 210g that are attenuated as compared to other beams in the illumination pattern. The attenuated deflected beams 210f and 210g correspond to an area occupied by a reflective target 136. Accordingly, by attenuating those deflected beams 210, the intensity of the return signal received at the detector of the LIDAR system 104 is reduced.

Figure 1C:
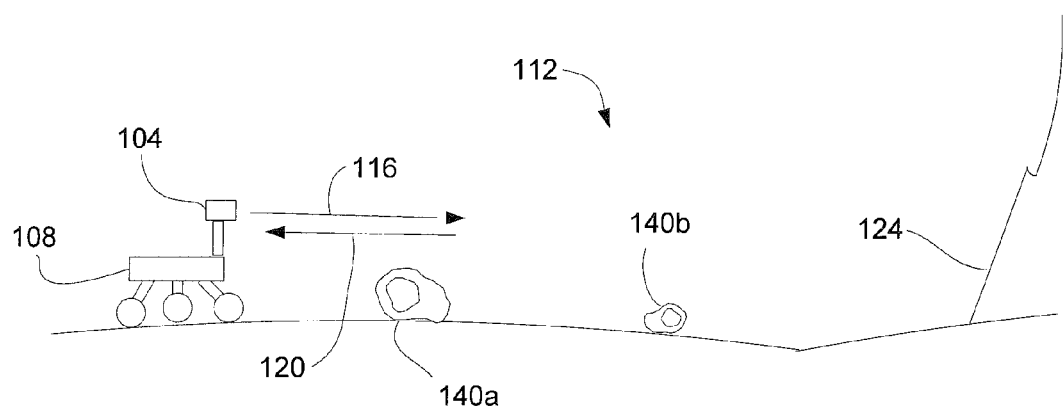

FIG. 1C illustrates a LIDAR system 104 in accordance with embodiments of the present invention in yet another exemplary operating environment. More particularly, in this example, the platform 108 comprises an autonomous rover. The scene 112 encountered by the LIDAR system 104 in this example includes a rock 140a in relatively close proximity to the LIDAR system 104, a rock 140b in the middle distance, and a terrain feature 124, in this example a cliff, in the background. In this scenario, illumination light 116 may be reflected most strongly by the nearest rock 140a, resulting in saturation of detector pixels in the area within the field of view of the LIDAR system 104 corresponding to the first rock 140a. Light 120 reflected from the second rock 140b may be within the dynamic range of the LIDAR system 104 detector. At least some of the light 120 reflected from the cliff 124 may be within the dynamic range of the LIDAR system 104 detector. Accordingly, a LIDAR system 104 in accordance with embodiments of the present invention can use range information to adapt the illumination light 116 produced by the LIDAR system 104 to a particular scene 112. More particularly, nearby objects can be illuminated at lower intensities and/or with a smaller number of beams than objects at relatively long range. In the example of FIG. 1C, this can include reducing the intensity and/or the number of beams incident on the first rock 140a, and increasing the intensity and/or the number of beams incident on the cliff 124.

Figure 2I:
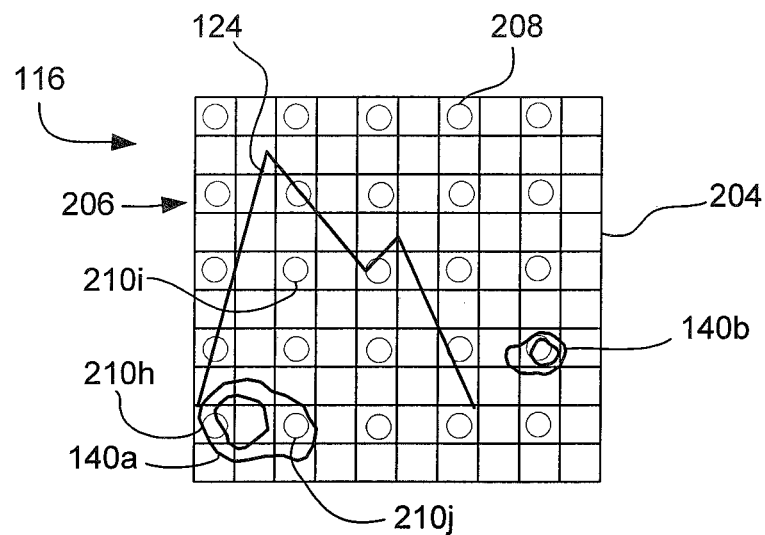
Figure 2J:
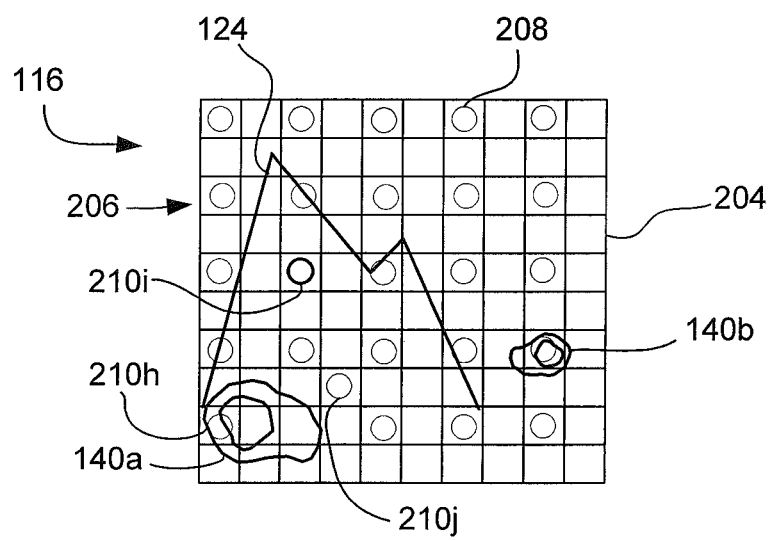

FIG. 2I illustrates illumination light 116 in an initial or interrogation pattern 206 incident on the scene 112 depicted in FIG. 1C. From the range information obtained by the interrogation signal or pattern 206, adjustments to the effective intensity of the light 116 used to illuminate the scene 112 can be made. In particular, as illustrated in FIG. 2J, beam 210h, incident on the near rock 140a, has an intensity that is decreased as compared to the corresponding beam 210h in the interrogation signal. Beam 210i, incident on the cliff 124, has an intensity that is increased as compared to the intensity of the corresponding beam 210i in the interrogation signal. In addition, beam 210j, which was incident on the near rock 140a in the interrogation signal (see FIG. 2I) has been steered such that in the adapted illumination light 116, the beam 210j is incident on the cliff in the adapted pattern shown in FIG. 2J. Although the adaptation made to the illumination light 116 illustrated in FIGS. 2I and 2J features changes to both the intensity and the number of beams used to illuminate particular features within a scene 112, it should be appreciated that adaptation of illumination light 116 in accordance with embodiments of the present invention can utilize changes in intensity, location and/or total number of beams.

Figure 2K:
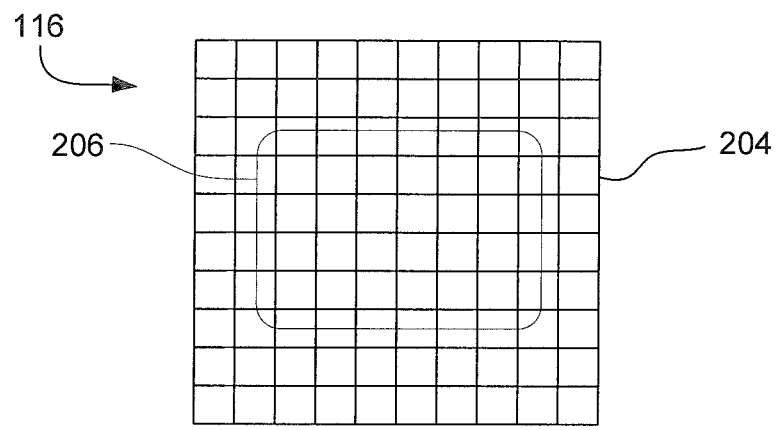

FIG. 2K illustrates illumination light 116 configured in a non-discrete illumination pattern 206. In this example, the illumination light 116 is distributed across an illumination pattern 206 comprising a substantially rectangular area. Moreover, the intensity of the illumination light 116 is the same or approximately the same across the entire pattern 206. The illumination pattern 206 illustrated in FIG. 2K can comprise an interrogation signal or pattern 206, or can comprise a pattern 206 used to obtain information about an imaged scene.

Figure 2L:
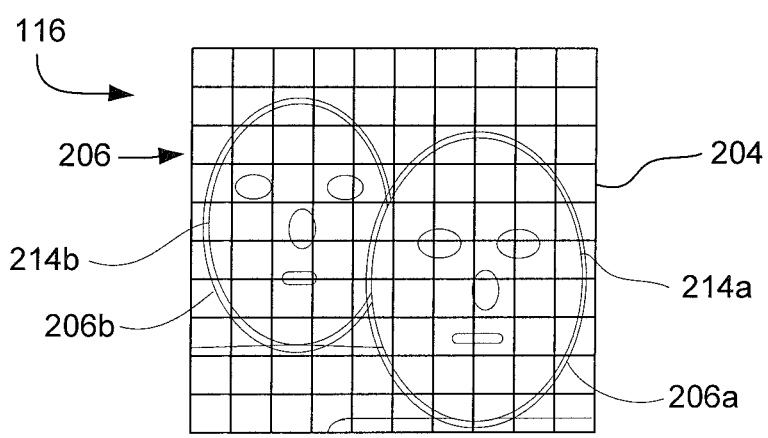

In FIG. 2L, an example of a non-discrete illumination pattern 206 is illustrated, with different areas of the imaged scene 112 provided with different intensities of illumination light 116. More particularly, the scene 112 in this example comprises a portrait of two people, with a first person 214a closer to the imaging system 104 then the second person 214b. The illumination light 116 is disposed in a pattern 206 that includes a first area 206a, generally corresponding to the face of the first person 214a in the scene 112, and a second portion 206b in an area of the imaged scene 112 generally corresponding to the face of the second person 214b. Moreover, because the first person 214a is closer to the imaging system 104 than the second person 214b, the first area of illumination 206a is of lower intensity than the second area of illumination 206b. Accordingly, non-discrete illumination patterns 216 can include areas having different illumination intensities. The illumination pattern 206 in FIG. 2L is an example of a pattern that might be produced by an imaging system 104 in response to information about a scene obtained using an interrogation signal and/or a previous or earlier frame or instance of illumination light 116.

A LIDAR system 104 can also be used in connection with docking to the international space station or other spacecraft. FIG. 1D illustrates a LIDAR system 104 in accordance with embodiments of the present invention in an example rendezvous and docking scenario. The LIDAR system 104 is carried by a platform 108 comprising a spacecraft. The target scene 112 in this example comprises the international space station (ISS) 144. The LIDAR system 104 can initially produce illumination light 116 as part of a long range search. In the long range search mode, the illumination light 116 may be distributed in an illumination pattern 206, like that illustrated in FIG. 2E, where light is distributed across the field of view 204 of the LIDAR system 104. Once the ISS 144 is located, the beam pattern 206 can be adjusted to match the observed size of the ISS 144. Moreover, as the spacecraft 108 approaches the ISS 144, the illumination pattern 206 can be adopted to match retroreflectors 136 located on the ISS 144, for example in the vicinity of the docking port 148, or to match non-cooperative targets.

Figure 3A:
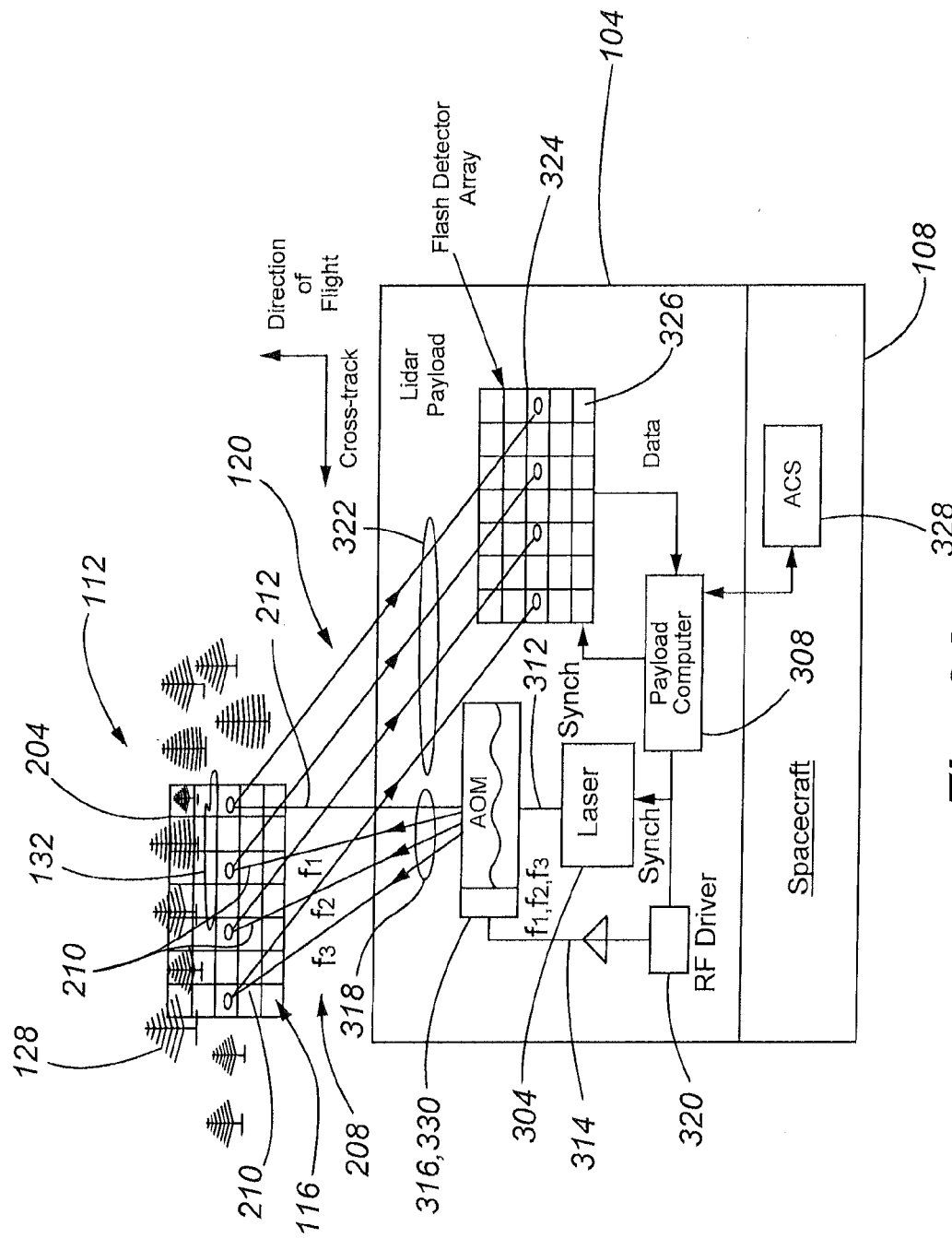
FIGS. 3A-3F depict components of LIDAR systems in accordance with embodiments of the present invention.

In FIG. 3A, components of a LIDAR system 104 carried by a platform 108 comprising a spacecraft are illustrated. In general, the LIDAR system 104 includes a light source 304 operated in response to signals received from a payload computer or controller 308. The light source 304, which may comprise a laser providing coherent light, produces a primary beam 312 that is input to an electronic beam forming or steering device 316. Operation of the beam forming device 316 may be in response to control signals received from the payload computer 308, directly or via a driver circuit or chip 320. The LIDAR system 104 also includes a detector 324, which typically comprises a multiple element or multiple pixel detector 324. Accordingly, the LIDAR system 104 may comprise a flash or imaging LIDAR system 104 with a two-dimensional detector array. In accordance with other embodiments, the detector 324 may alternatively comprise a one-dimensional detector array or a single element detector. The detector 324 is operated under the control of the payload computer 308, and data collected by the detector 324 may be provided to the payload computer 308. For example, a multiple pixel detector 324 may feature a plurality of pixels 326 arranged in a two-dimensional array with an active area that receives reflected light 120 within the field of view 204 of the LIDAR system 104. Moreover, the multiple pixel detector may comprise a multiple pixel charge coupled device or other multiple element photon detector.

In accordance with embodiments of the present invention, the payload computer 308 may comprise high speed electronics, in the form of a programmable processor, application specific integrated circuit (ASIC), or a collection of integrated or discrete circuits and components, that generally controls operation of the LIDAR system 104. For example, in connection with obtaining range information, the payload computer 308 can perform timing functions. Moreover, the payload controller 308 can receive intensity information from the multiple pixel detector 324, and, as described herein, adapt the intensity of at least portions of the illumination light 116. In accordance with still other embodiments of the present invention, the LIDAR system 104 is not required to perform a range determining function. Accordingly, a system 104 that does not perform a range determining function, or a LIDAR system 104 that is operated in a two-dimensional mode, does not need to perform the timing functions required of a LIDAR system 104 that is operating in a three-dimensional mode or that is otherwise collecting range information.

In accordance with embodiments of the present invention, the light source 304 comprises a laser. Moreover, the light source 304 can comprise a pulsed laser, or a continuous wave laser. In accordance with still other embodiments, the light source 304 can comprise a single laser or an array including multiple lasers. An example of a light source 304 comprising an array includes a vertical cavity surface emitting laser (VCSEL) configured to provide an array of lasers. In accordance with still other embodiments, a laser array, whether comprising a VCSEL or otherwise, can include emitters that can be independently controlled. Moreover, a light source 304 can comprise an array of fiber coupled lasers. In accordance with still other embodiments, the light source 304 need not comprise a laser. For example, and without limitation, the light source can comprise a light emitting diode (LED), an LED array, one or more incandescent sources, or one or more electronic flashtubes.

The spacecraft 108 can include an attitude control system 328. In addition to controlling the orientation and/or location of the spacecraft, the attitude control system 328 can provide the payload computer 308 with information regarding the location of the LIDAR system 104. In addition, the LIDAR system 104 can operate to provide the attitude control system 328 with location information, for example information regarding the location of the platform 108 relative to a target scene 112.

The LIDAR system 104 generally operates the beam forming device 316 to illuminate a scene 112 with illumination light 116. More particularly, the beam forming device 316 may be operated to deflect or steer one or more beams 208 of illumination light 116. Moreover, the beam forming device 316 may be operated to control the number of beams (or beamlets) 208 comprising the illumination light 116, the angle at which each beam 208 exits the LIDAR system 104, and the intensity of each beam 208. In accordance with embodiments of the present invention, this control may be accomplished by creating and controlling beams 208 comprising deflected beams 210 using the beam forming device 316. In accordance with embodiments of the present invention comprising an array type light source 304, a beam forming device 316 need not be included, as individual beams 208 within an illumination pattern 206 can be controlled by controlling the output from elements of the array.

The LIDAR system 104 may additionally include transmit optics 318 and/or receive optics 322. For example, transmit optics 318 may include optics for controlling or shaping one or more of the beams 208 output by the LIDAR system 104. As an example, transmit optics 318 comprising a lens or lens system operable to disperse the light from one of the beams 208, such as a primary or undeflected beam 212, so that it illuminates an area within the field of view 204 of the LIDAR system 104 corresponding to a plurality of pixels 326 of the multiple pixel detector 324 can be provided. As can be appreciated by one of skill in the art, receive optics 322 may be configured to focus light returned to the LIDAR system 104, including reflected light 120, onto the multiple pixel detector 324.

The LIDAR system illustrated in FIG. 3A is shown with a single beam forming device 316. More particularly, the beam forming device 316 comprises an acousto-optic modulator (AOM) beam deflector 330. By providing a single AOM beam deflector 330 as a beam forming device 316, a plurality of deflected beams 210 can be formed at different angles with respect to an input beam 312. More particularly, as can be appreciated by one of skill in the art, by providing input signals from a driver circuit 320 comprising a radio frequency driver at different frequencies, the AOM beam deflector 330 can output different deflected beams 210 at different angles with respect to the input beam 312. Specifically, the angle at which a deflected beam 210 thus formed is output is determined by the particular frequency applied by the RF driver 320 as an input signal 314 to the acousto-optic modulator, and the number of deflected beams 210 formed is generally equal to the number of different frequencies included in the input signal 314. In addition, the intensity of individual deflected beams 210 can be controlled by controlling the intensity of the corresponding input signal 314, and without requiring modulation of the input beam's 312 power. The resulting one or more beams 208 produced from providing an input beam 312 and one or more input frequencies to the AOM beam deflector 330 therefore include one or more steered beams 210 that each have an angle with respect to the input beam 312 that is determined by the frequency of their corresponding input signal and an intensity that is at least partially determined by the intensity of their input signal, and an undeflected beam 212.

Figure 3B:
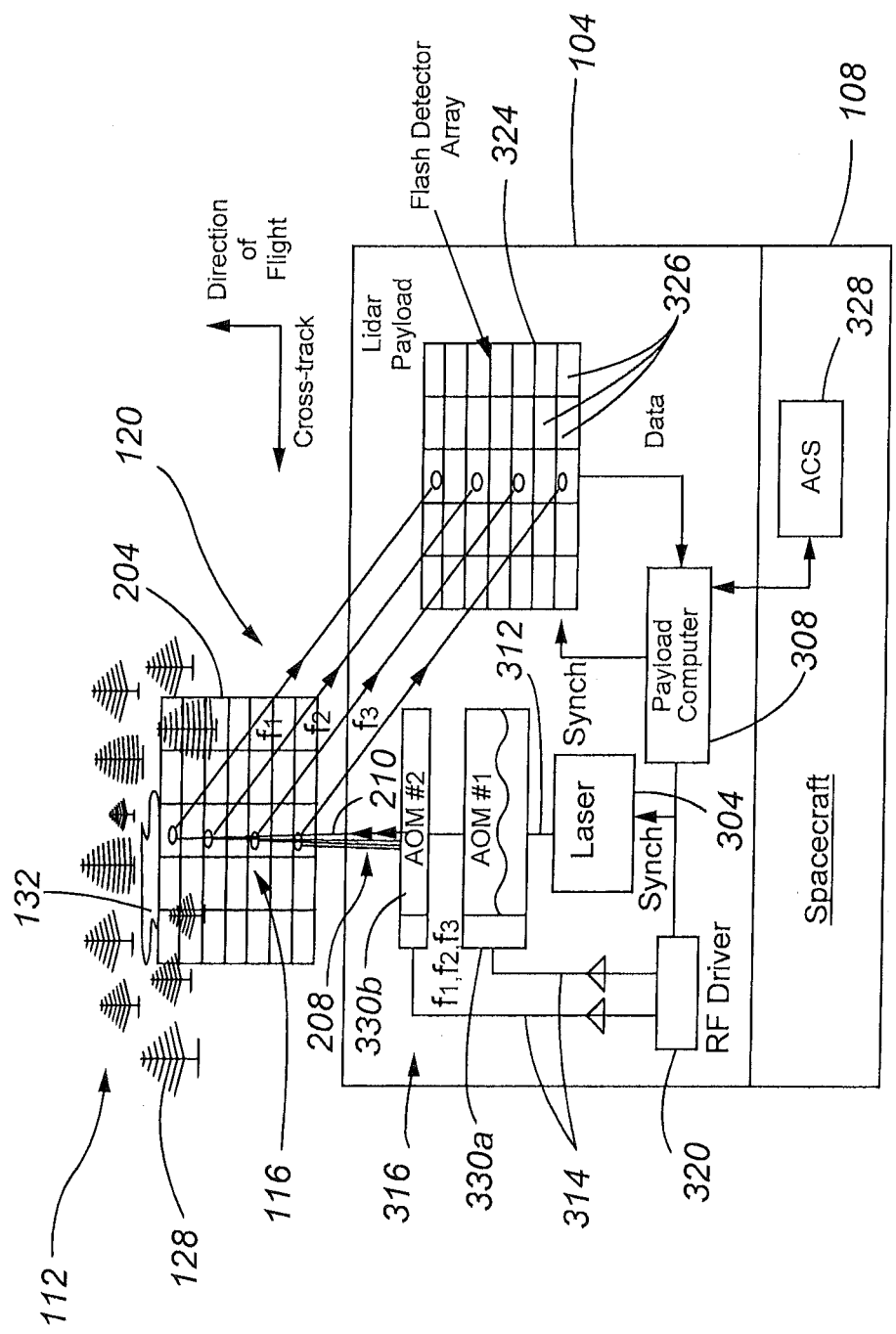

FIG. 3B illustrates components of a LIDAR system 104 in accordance with further embodiments of the present invention. In this example, a beam forming device 316 comprising first 330a and second 330b acousto-optic modulators is provided. As can be appreciated by one of skill in the art, the inclusion of a second acousto-optic modulator 330b, in series with a first acousto-optic modulator 330a, allows deflected beams 210 formed by the LIDAR system 104 to be steered in two dimensions. Accordingly, such embodiments facilitate the production of illumination light 116 comprising a two-dimensional array of beams 208. Moreover, this arrangement allows the pattern 206 of the deflected beams 210 included in the illumination light 116 to be selected pseudo-randomly. Moreover, the intensity and location of individual deflected beams 210 can be individually controlled.

Figure 3C:
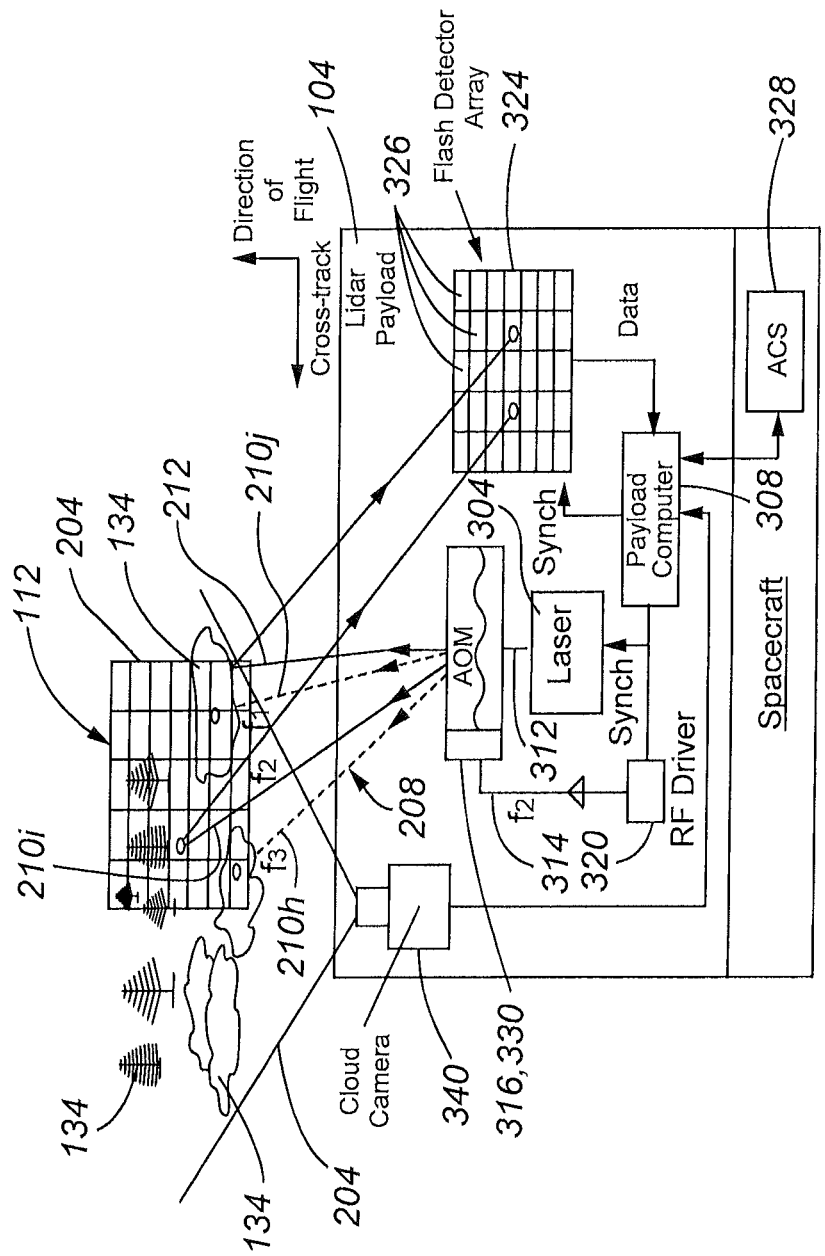

FIG. 3C illustrates a LIDAR system 104 in accordance with still other embodiments of the present invention. In this example, the LIDAR system 104 includes a two-dimensional camera 340. The two-dimensional camera 340, which may comprise a conventional, visible wavelength and/or extended wavelength camera, can be used to detect obstacles within the field of view 204 of the LIDAR system 104. For example, the two-dimensional camera 340 may be used to obtain images of cloud formations 134 that at least partially obscure a view of a target scene 112 from the LIDAR system 104. Specifically, information regarding the location of clouds 134 relative to the LIDAR system 104 can be used to select an illumination pattern 206. For instance, as illustrated in FIG. 3C, an illumination pattern 206 that nominally includes an undeflected beam 212 and three deflected beams 210h-j can be modified such that the beams 210h and 210j, which would intersect the clouds 134 if they were generated according to the nominal illumination pattern 206, can be turned off. As a result, the portion of the input beam 312 that would normally have been distributed between the three beams 210h-j can instead be concentrated into beam 210i, which can pass to the target scene 112 without being intersected by clouds 134. As can be appreciated by one of skill in the art, where the beam forming device 316 comprises an acousto-optic modulator 330, this can be achieved by providing an input frequency from the radio frequency driver 320 to the AOM 330 corresponding to the second beam 210i, and by not sending frequencies corresponding to the first 210h and third 210j beams. Similarly, the LIDAR system 104 could be used to track clouds or plumes of smoke or dust as the platform 108 passes over them. Moreover, the LIDAR itself, or a secondary LIDAR, could be used to detect the locations of clouds 134 or other obstructions for purposes of adapting the illumination pattern 206 so that the obstructions are avoided, without requiring the use of a two-dimensional camera 340.

Figure 3D:
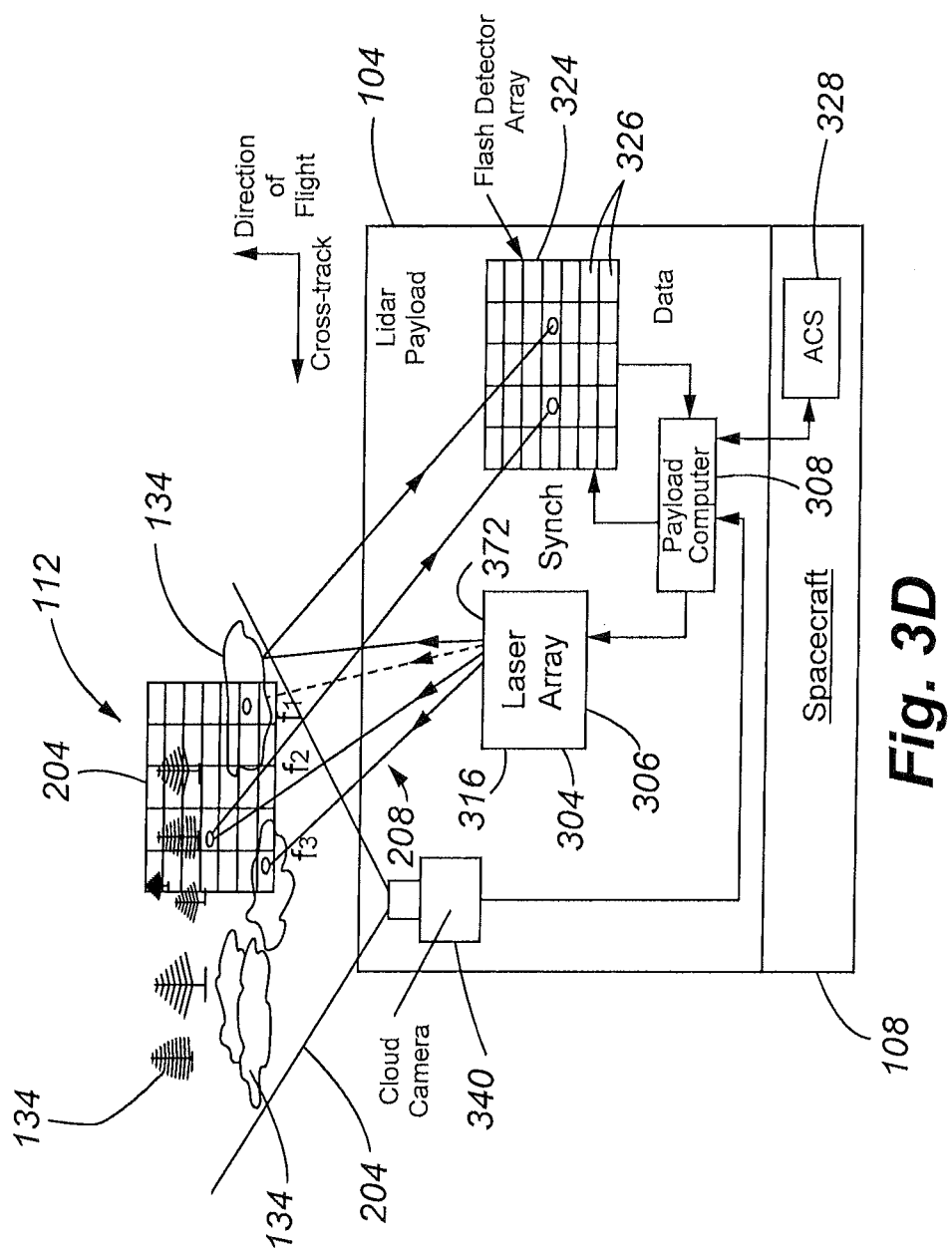

FIG. 3D illustrates yet another embodiment of a LIDAR system 104 in accordance with embodiments of the present invention. In such embodiments, the light source 304 and the beam forming device 316 may be provided by a laser array 306. The laser array 306 generally includes multiple laser sources comprising beam sources 372 arranged in a one-dimensional or a two-dimensional array. The laser array 306 may be provided by beam sources 372 comprising multiple laser devices configured such that the output beams 208 of the devices are in a desired azimuth and elevation with respect to a reference plane associated with the laser array 306. In accordance with still other embodiments, the laser array 306 may comprise a VCSEL array. In accordance with still other embodiments, the laser array 306 may comprise multiple lasers, with beams that are passed through fiber optic elements such that the beams exit the laser array 306 at a desired angle and relationship to other beams within the laser array 306. As shown, individual beams 208 can be selectively activated to adapt the pattern 206 of illumination light 116 to the scene 112.

Figure 3E:
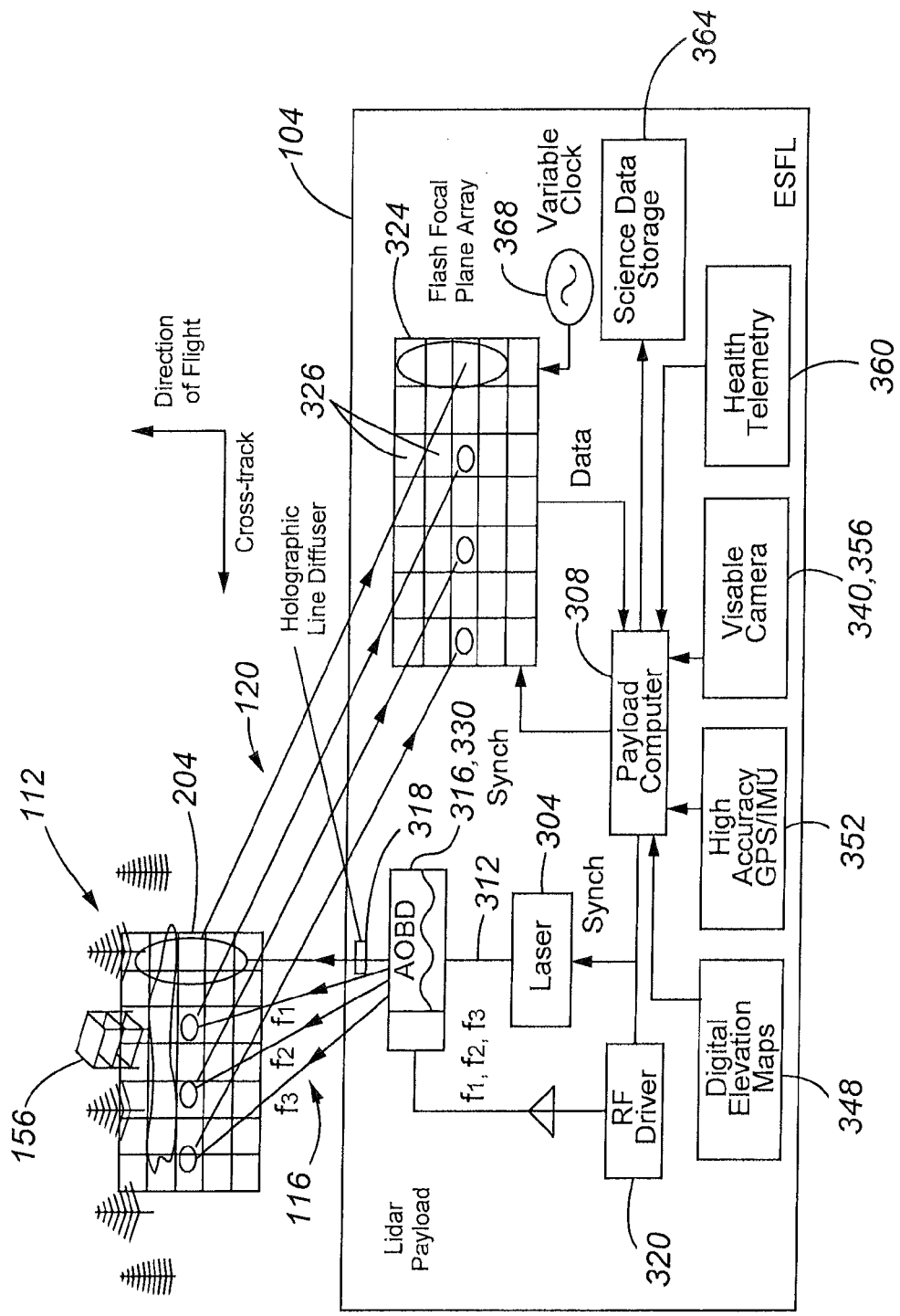

FIG. 3E illustrates still another embodiment of a LIDAR system 104 in accordance with embodiments of the present invention. In such embodiments, which may, for example, be carried by a platform 108 comprising an airplane, the LIDAR system 104 includes a beam steering device 316 comprising an acousto-optic beam deflector 330. In accordance with further embodiments, the acousto-optic beam deflector or modulator 330 can comprise a two-dimensional beam deflector to allow for the steering of deflected beams 210 in two dimensions. The LIDAR system 104 additionally includes output optics 318 comprising an engineered diffuser or a holographic line diffuser. Moreover, the output optics 318 are associated with the undeflected beam 212, and are not associated with any of the deflected beams 210. By applying the output optics 318 to the undeflected beam 212, the shape of the undeflected beam 212 can be controlled. In the present example, the shape of the undeflected beam 212 is controlled so that it occupies an area corresponding to a plurality of pixels 326 at the multiple pixel detector 324. This approach has the advantage of providing acrosstrack coverage and an enhanced alongtrack coverage that could reduce the repetition rate required of the laser to achieve contiguous alongtrack coverage. A LIDAR calibration target 156 is included in the scene 112. Intensity and/or range information collected by the LIDAR system 104 with respect to light reflected by the calibration target 156 can be used to adjust or adapt the illumination light 116 incident on the scene.

In addition, the LIDAR system 104 may incorporate additional features and components. For example, digital elevation maps 348, global positioning system and/or inertial motion tracker devices 352, a two-dimensional camera 340 comprising a visible wavelength camera 356, and a health telemetry unit 360, the outputs of which may be provided to the payload computer 308 for use in operation of the LIDAR system 104, can also be included. In addition, science data storage 364 may be provided to store science data output by the payload computer 308 and/or other devices. Also illustrated is a variable clock 368, for providing clock data used in operation of the LIDAR system 104 multiple pixel detector 324.

Figure 3F:
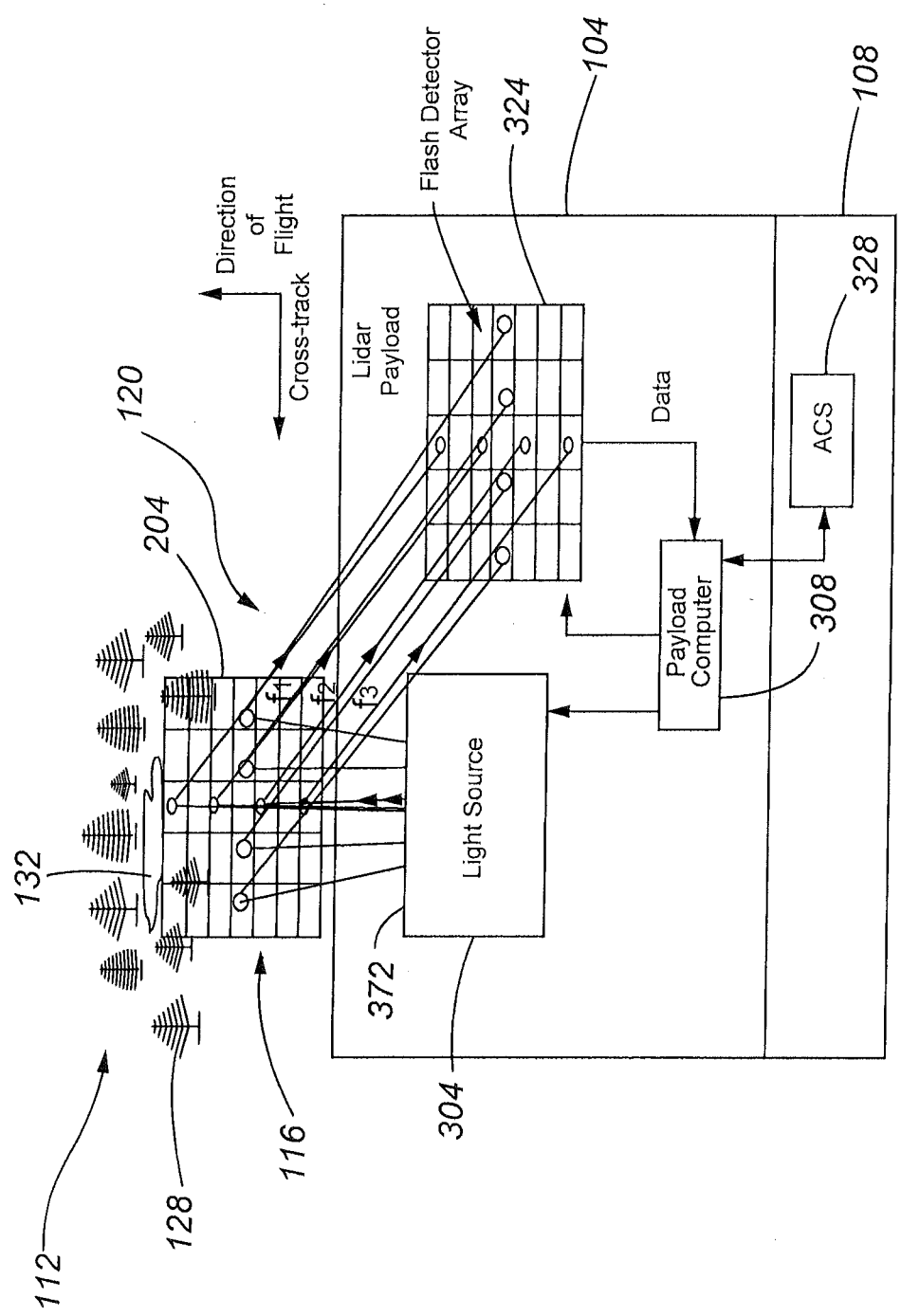

In FIG. 3F, yet another embodiment of a LIDAR system 104 in accordance with embodiments of the present invention is illustrated. In this example, the LIDAR system 104 includes a light source 304 that comprises a two-dimensional array of beam 208 sources 372. In accordance with such embodiments, the payload computer 308 can control the light source 304 to actuate beam 208 sources 372 that illuminate selected areas within a scene 112. In the example of FIG. 3F, the beam pattern 206 of the illumination light 116 includes beams 208 that are aligned with vertical and horizontal axes. The reflected light 120 is in turn received along vertical and horizontal axis of the multiple element detector 324. Different illumination patterns 206 can be generated by selecting different beam sources 372 within the light source 304 array. For example, areas within a scene that are particularly reflective, such as a body of water 132, can be illuminated by a lesser number of beams 208 than other areas of the scene 112, to avoid saturation of the pixels 326 of the multiple element array 324. In addition, the system 104 illustrated in FIG. 3F is not strictly a LIDAR system, in that there is no synchronization required between the light source 304 and the multiple pixel detector 324. Accordingly, the embodiment illustrated in FIG. 3F does not capture range information.

Figure 4:
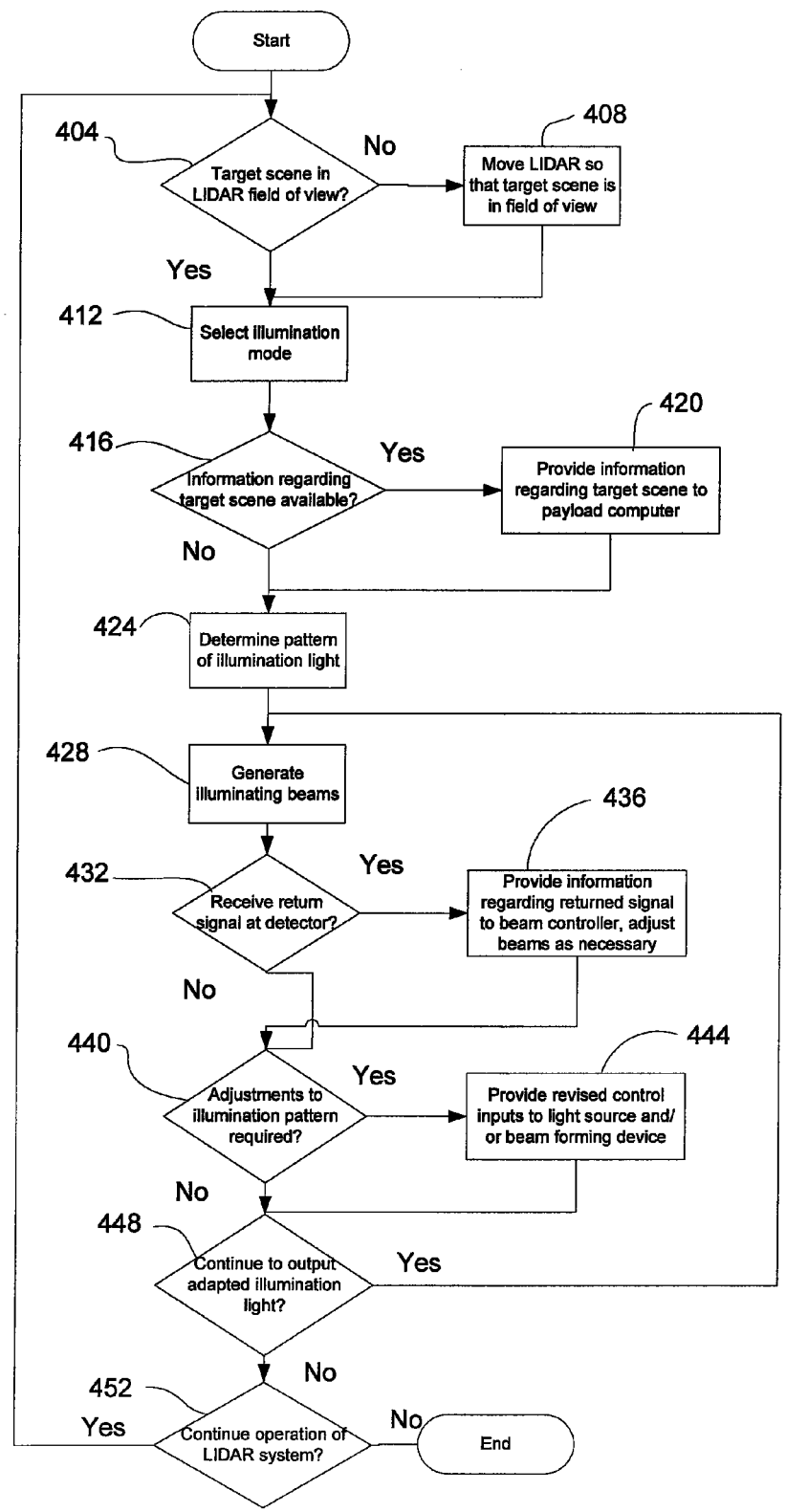
FIG. 4 depicts aspects of the operation of a LIDAR system in accordance with embodiments of the present invention.

With reference now to FIG. 4, aspects of the operation of a LIDAR system 104 in accordance with embodiments of the present invention are illustrated. Initially, a determination is made as to whether the desired target scene 112 is in the field of view 204 of the LIDAR system 104 (step 404). If the target scene 112 is not within the field of view, the LIDAR 104 is moved to bring the target scene 112 into the field of view (step 408). As can appreciated by one of skill in the art, the determination as to whether a desired target scene 112 is within the field of view 204 of the LIDAR system 104 may be performed in connection with the data collected by the LIDAR system 104. Alternatively or in addition, information regarding the location of the LIDAR system relative to the target scene 112 can be provided by other devices or systems, or by a human operator. For example, the LIDAR system 104 may be operated in a terrain relative navigation mode, and/or a target identification mode, to determine whether a desired target scene 112 is within the field of view 204 of the LIDAR system 104. Therefore, the desired target scene 112 may include scenes 112 that are encountered while moving the LIDAR system 104 to a location from which a desired target scene 112 is within the field of view 204 of the LIDAR system 104.

Once the (intermediate or final) target scene 112 is in view, the illumination mode for the LIDAR system 104 is selected (step 412). For example, where the LIDAR system 104 is being moved towards a final target scene 112, a concentrated line or spot illumination pattern 206 may be selected to provide terrain relative navigation information and/or long range altitude information. As another example, as the LIDAR system 104 is moved along a track, an along track illumination pattern or a cross-track illumination pattern may be selected. As still another example, when a desired terminal target scene 112 is in the field of view 204 of the LIDAR system 104, such as in a landing or docking scenario, the illumination pattern may be switched to an imaging mode, such that a two-dimensional array of beams 208 is produced. The size of the array can be matched to the size of the scene to prevent light from missing the scene and being lost.

At step 416, a determination is made as to whether information regarding the target scene 112 is available. If information regarding the target scene 112 is available, that information is provided to the payload computer 308, and can be used to modify a selected or default illumination pattern 206 that would otherwise be applied for the selected illumination mode (step 420). Examples of information regarding the target scene 112 that can be used in modifying an illumination pattern 206 include the presence and relative location of features or targets within the scene 112, the relative reflectivity of the scene or portions of the scene 112, areas of particular interest within the scene 112, or other information that can be used to select an appropriate illumination pattern 206. At step 424, the illumination pattern 206 is determined. In particular, if information regarding the target scene 112 is available, that information is applied in combination with the selected illumination mode to determine an appropriate illumination pattern 206. The determination of an appropriate illumination pattern can include selecting from a number of predetermined patterns 206, for example based on the selected illumination mode, or on other available information, even if information regarding a particular target scene 112 is not available. In addition, and in particular when information regarding the specific target scene is available, selecting the illumination pattern 206 can include generating an illumination pattern 206 that is configured for application to the target scene 112. Illuminating beams 208, which may include deflected beams 210 and/or an undeflected beam 212, are then generated or outputted (step 428). In accordance with embodiments of the present invention, this initial illumination pattern 206 may comprise an interrogation pattern.

A determination may then be made as to whether a return signal 120 has been received at one or more of the pixels 326 of the multiple pixel detector 324 (step 432). If a return signal 120 is received, information regarding the return signal 120 is provided to the payload computer 308 (step 436). The payload computer 308 can then determine whether, based on the information received from the multiple pixel detector 324, adjustments to the pattern 206 of the illumination signal or light 116 are desirable or required (step 440). If it is determined that adjustments should be made, they are implemented by providing a suitable control signal to the light source 304 and/or the beam forming device 316 (step 444). Examples of adjustments that may be made include adjustments needed to avoid saturation of one or more pixels 326 of the multiple pixel detector 324. For instance, where a reflector 136 or a particularly reflective natural feature 132 or 140 is within the field of view 204 of the LIDAR system 104, or is closer to the LIDAR, reflected light 120 from areas including the reflector 136 and/or feature 132, 140 can be significantly higher than reflected light 120 from other areas of a target scene 112. Moreover, given the limited dynamic range of most multiple pixel detectors 324, the saturation of one or more pixels 326 results in a loss of information. In addition, given the limited illumination light 116, in accordance with embodiments of the present invention, deflected beams 210 directed to areas of the scene 112 that reflect enough light to saturate the corresponding pixels 326 of the detector 324 can be redeployed to other areas. This can be accomplished by reducing the intensity of deflected beams 210 incident on particularly reflective areas of the scene 112, by steering the deflected beams 210 incident on particularly reflective areas to other areas of the scene 112, and/or by turning off deflected beams 210 incident on particularly reflective areas of the scene 112. More particularly, the payload computer 308 can direct the radio frequency driver 320 to provide input signals 314 to the beam forming device 316 to adjust the beams 208 as required.

Although examples of situations in which changes in the pattern of illuminating light 116 are made in response to receiving reflected light 120 that exceeds the dynamic range of pixels 326 of the detector 324, adjustments can also be made where reflected light 120 is not received, at least in intensities sufficient enough to be detected. For example, where a target scene 112 is otherwise believed to be within the field of view 204 of the LIDAR system 104, but no features have been detected, the output light 116 can be concentrated into a relatively small number of beams at relatively high intensity. In accordance with still further embodiments, a return signal from an element determined to be at a distance not corresponding to a distance to a desired target scene 112 can be used to determine the presence of a blocking element, such as a cloud 134 between the LIDAR system 104 and the target scene 112. Such information can be in the form of a range to a target detected at a pixel 326 that is less than a known or estimated range to a desired target scene 112. An illumination pattern 206 that avoids such blocking elements can then be output. As yet another example, only those beams 208 that are determined to provide a return signal 120 detected by the multiple pixel detector 324 may be output. In accordance with further embodiments of the present invention, information obtained by the LIDAR system 104 regarding the range to elements within an illuminated scene 112 can be used to provide information about the scene from which adaptations to the illumination pattern 206 can be made.

At step 448, a determination may be made as to whether an adapted illumination pattern 206 is to continue to be generated or outputted. If the generation of an adapted illumination pattern 206 is to be continued, the process returns to step 428. If the generation of an adapted illumination pattern is to be discontinued, a determination may next be made as to whether the operation of the LIDAR system 104 is to be continued (step 452). If operation is to be continued, the process may return to step 404. Alternatively, the process may end.

As can be appreciated by one of skill in the art from the description provided herein, embodiments of the present invention apply feedback provided by a multiple pixel detector 324 to control or adjust light 116 used to illuminate a scene 112. Moreover, it can be appreciated that different areas within a scene 112 can be illuminated by light of different intensities. Moreover, this differential or adaptive illumination of different areas within a scene 112 can be accomplished through the selective steering of individual deflected beams 210 of light provided as output 116 to illuminate a scene 112, and/or through the control of the intensities of individual deflected beams 210 of illuminating light 116. In accordance with further embodiments of the present invention, this differential or adaptive illumination of different areas of a scene can be achieved through the selective activation of beams 208 produced by a light source 304 comprising an array of beam 208 sources 372. In addition, it should be appreciated that embodiments of the present invention allow for beams 208 within an illumination pattern 206 to be controlled in a random or pseudo-random access fashion. Moreover, beams 208 can be produced or controlled to produce an illumination pattern 206 comprising discrete spots. Alternatively or in addition, beams 208 can be produced or controlled to produce an illumination pattern 206 that comprises one or more contiguous areas of light.

In embodiments providing a beam forming device 316 comprising a single AOM beam deflector 330, the angle of individual deflected beams 210, relative to an input beam 312, can be controlled in one dimension. Moreover, the relative intensities of the deflected beams 210 can be controlled by controlling the intensity of the input frequencies provided to the AOM beam deflector 330. By providing a beam forming device 316 comprising first and second AOM beam deflectors 330, the angle of deflected beams 210 relative to an input beam 312 can be controlled in two dimensions. Moreover, the relative intensities of the deflected beams 210 can be controlled. This pseudo-random access control of deflected beams 210 provided as part of illumination light 116 allows embodiments of the present invention to vary the intensity of the illumination light 116 across the field of view 204 of the LIDAR system 104. In accordance with still other embodiments, a light source 304 comprising an array of beam 208 sources 372 can be operated to provide an illumination pattern 206 that is adapted to a particular scene. In particular, individual sources 372 can be operated in such embodiments so that a desired illumination pattern 206 is output. Accordingly, illumination light 116 can be selectively distributed, so that the reflected light 120 received at individual pixels 326 of the multiple pixel detector 324 is within the dynamic range of those pixels 326 and/or is directed to pixels 326 receiving reflected light 120 from areas within the field of view 204 of the LIDAR system 104 corresponding to areas of particular interest or importance within the target scene 112.

In accordance with embodiments of the present invention, a LIDAR system 104 that is capable of providing range information is described. Moreover, at least some embodiments incorporate a multiple pixel detector 324 comprising a two dimensional array, enabling the acquisition of image information from a target scene in three dimensions. More particularly, frames of data can be obtained, with each frame taken at a different moment in time. Moreover, for each frame, intensity and range information can be obtained. As can be appreciated by one of skill in the art, intensity information can be obtained from the pixels 326 of the multiple pixel detector 324, while range information can be obtained by determining a time of flight by determining the time elapsed between the production of a beam 208 of light and the time at which reflected light 120 corresponding to that beam 206 is received at a pixel 326 of the multiple pixel detector 324. Control of beams 208 in accordance with embodiments of the present invention allows those beams 208 to be pointed towards areas of a target scene 112, so that reflected light is received by individual pixels 326 of the multiple pixel detector 324. Alternatively or in addition, beams 208 can be controlled so that at least portions of multiple pixels 326 correspond to areas of the target scene 112 illuminated by such beams 208. As can be appreciated by one of skill in the art, a beam forming device 316 comprising one or more AOM beam deflectors 330 will output a single undeflected beam 212, in addition to from 0-n deflected beams 210, where n is equal to the maximum number of frequencies provided to the AOM beam deflector or deflectors 330 as an input signal 314. In accordance with embodiments of the present invention, the undeflected beam 212 can be included in the illumination light 116 within the field of view 204 of the LIDAR system 104. In accordance with still other embodiments, the undeflected beam 212 can be attenuated, steered, thrown out, blocked, or otherwise modified. Where the light source 304 comprises an array of beam sources 372, the number of beams 208 included in the illumination light 116 can range from 1-m, wherein m is the total number beam sources 372.

In accordance with still other embodiments of the present invention, range information need not be collected and/or determined. Accordingly, embodiments of the present invention are not limited to LIDAR systems. For example, a system in accordance with embodiments of the present invention can comprise any system that includes a light source 304 that, in cooperation with a beam forming device 316, can be operated to produce multiple, independently controlled beams 208 to illuminate a scene 112 that is partially or entirely within a field of view 204 of the system. In accordance with further embodiments of the present invention, the light source 304 may comprise an array of lasers or fiber-coupled lasers with associated lenses or microlens arrays. In accordance with still other embodiments, a light source 304 can comprise a non-laser source, such as an electronic flash tube or an array of electronic flash tubes. Moreover, a non-laser light source can be associated with one or more beam forming devices 316 and/or transmit optics 318. Moreover, a beam forming device 316 can comprise a liquid crystal display (LCD) or other panel in which areas of the panel can be controlled to selectively transmit or block light provided from a light source 304, to produce an illumination pattern 206 having an intensity that is controlled or varied such that different areas within a scene 112 can be provided with different intensities of illumination light 116. In accordance with further embodiments, any one of multiple degrees of transmission can be selected at different areas of the beam forming device 316. Alternatively or in addition, the beam forming device may comprise an array of pixels that can be switched between a state of maximum transmission and a state of maximum opaqueness. In accordance with such embodiments, a beam 208 may comprise an area of an illumination pattern 206 produced by the beam forming device 316.

Systems in accordance with embodiments of the present invention include a multiple pixel detector 324 that provides a feedback signal to a controller, such as a payload computer 308, that is used to adjust characteristics of at least one of the beams 208 used to illuminate the scene 112. Moreover, this control can be differential, in that different beams 208 are controlled independently of other beams 208. Accordingly, embodiments of the present invention can comprise imaging cameras or other systems that provide an illumination source and receive a reflected signal. More particularly, embodiments of the present invention can include any system with a multiple pixel or element detector 324 that provides feedback to a beam forming device 316 that is capable of implementing individual control of one or more beams 208 used to illuminate a scene 112.

Although exemplary embodiments of LIDAR systems 104 have been described that incorporate a beam forming device 316 comprising one or more acoustic optic modulators 330, other configurations are possible. For example, a beam forming device 316 may comprise a liquid crystal device to control the intensity of individual beams 208 within an illumination pattern 206. In accordance with still other embodiments, the beam forming device 316 may comprise an electro-optic device, comprising a crystal having an index of refraction that can be controlled according to applied voltage. Beam forming can be performed by arrays of lasers or fiber-coupled lasers. Moreover, multiple electro-optic devices can be used to provide a beam steering device 316. As a further example, microelectrical mechanical systems (MEMS) microarrays can be used as a beam forming device 316. In addition, although portions of the description have related to the production of illumination patterns 206 that can be selected or modified in a random access manner such that the characteristics of a particular target scene 112 are accommodated, it should be appreciated that a pattern 206 can also include deflected beams 210 that are moved from frame to frame. In particular, scan patterns can be produced in which any number of deflected beams 210 are moved from frame to frame.

As mentioned above, embodiments of the present invention can also include beam forming devices 316 that include controllable panels. More particularly, such beam forming devices 316 can comprise panels that selectively transmit or reject light produced by a light source 304. Examples of such beam forming devices 316 include LCD panels. In accordance with still other embodiments, a beam forming device 316 can comprise controllable mirrors. Such mirrors can include steered mirrors. In accordance with still other embodiments, deformable mirrors can be provided to control the illumination pattern 206 used to illuminate a scene 112 with light from a light source 304.

In accordance with still other embodiments, a plurality of light sources 304 can be associated with a plurality of beam forming devices 316. For example, each light source 304 can comprise a laser, and each laser can be associated with a beam steering device 316 comprising a pair of AO beam deflectors 330. Such embodiments can allow for random access selection of illumination patterns 206.

In accordance with still other embodiments, different beams 208 having different polarization states can be produced simultaneously or sequentially. In particular, a beam 208 output by a beam steering device 316 comprising an AO beam deflector 330 is inherently polarized in a particular state. The polarization of a beam 208 output by an imaging system 104 in accordance with embodiments of the present invention can be used in interrogating targets, where those targets have a reflectivity that is polarization sensitive. For example, changes to the polarization state of beams 208 can be used in connection with atmospheric constituent detection and differentiation of biological species. In order to take advantage of polarization state information, illumination patterns 206 in which multiple beams 208 are generated from each pulse of the light source 304 and are projected by the beam steering device 316 at different angles. The different beams 208, having different polarization states, can then be co-aligned using subsequent optics so that the two distinct states are simultaneously projected to the same location in the target scene 112. As another example, beams 210 can be produced in which the polarization state of any or all of the beams 210 is modulated on a shot to shot basis. For instance, a beam of one polarization state on one shot of the laser can be followed by a beam having a different polarization state on the next shot of the laser, with both beams 210 being directed to the same location within the target scene 112.

As can be appreciated by one of skill in the art, different illumination patterns are desirable in different scenarios. For example, in a rendezvous and docking scenario, embodiments of the present invention can be operated to produce an illumination pattern 206 that is different for different phases of a rendezvous and docking procedure. In addition, search times can be improved by using different illumination patterns.

Embodiments of the present invention, and in particular embodiments that utilize a beam steering device 316 that include a fine adjustable beam angle, including a beam steering device 316 comprising an AO beam deflector 330, can be used to perform boresighting of the LIDAR system 104. More particularly, the electronic steering of one or more deflected or steered beams 210 permits alignment or boresighting of the illumination light 116 with the multiple pixel detector 326. In accordance with still other embodiments, electronic steering of one or more deflected beams 210 can be used to perform boresighting of illumination light 116 even in connection with a detector comprising a single pixel (i.e., in connection with a single element detector). Accordingly, mechanical steering mechanisms can be simplified or eliminated, which can reduce weight, cost and complexity of the LIDAR system 104.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for illuminating a scene, comprising:
    outputting light in a first illumination pattern, wherein the first illumination pattern includes a first plurality of beams that illuminate the scene at a first point in time;
    determining at least one of an intensity of light reflected from the scene as a result of illumination of the scene by the first illumination pattern or a range to an area of the scene determined from light included in the first illumination pattern;
    in response to determining the at least one of an intensity of light reflected from the scene as a result of illumination of the scene by the first illumination pattern or a range to an area of the scene determined from light included in the first illumination pattern, outputting light in a second illumination pattern, wherein the second illumination pattern includes a second plurality of beams that illuminate the scene at a second point in time, and wherein the first illumination pattern differs from the second illumination pattern.

2. The method of claim 1, wherein outputting light in a second illumination pattern includes steering at least one of the beams included in the first plurality of beams.

3. The method of claim 2, wherein outputting the second plurality of beams includes controlling at least a first beam included in the first plurality of beams, and wherein controlling at least a first beam included in the first plurality of beams includes at least one of:
    controlling an intensity of the first beam,
    controlling the first beam such that the first beam is incident on a selected area within the scene, and
    controlling the first beam such that the first beam is incident on an area adjacent the scene.

4. The method of claim 1, wherein the second illumination pattern is output in response to determining an intensity of light received at a first element of a multiple element detector as a result of illumination of the scene by the first illumination pattern.

5. The method of claim 4, wherein determining an intensity of light reflected from the scene while the scene is illuminated by the first illumination pattern includes receiving a signal from at least the first element of the multiple element detector.

6. The method of claim 5, wherein the signal received from the first element of the multiple element detector is greater than a threshold amount,
   wherein a signal received from a second element of the multiple element detector is less than the threshold amount,
   wherein outputting light in a second illumination pattern includes reducing an intensity of a first beam illuminating an area of the scene from which light received by the first element of the multiple element detector is reflected as compared to the intensity of a corresponding beam in the first illumination pattern, and
   wherein outputting light in a second illumination pattern does not include reducing an intensity of a second beam illuminating an area of the scene from which light received by the second element of the multiple element detector is reflected as compared to the intensity of a corresponding beam in the first illumination pattern.

7. The method of claim 5, further comprising:
   directing the second illumination pattern to the scene;
   in response to detecting that an intensity of light reflected from the scene while the scene is illuminated by the second illumination pattern exceeds a threshold amount, controlling the second illumination pattern to produce a third illumination pattern, wherein the second illumination pattern differs from the third illumination pattern.

8. The method of claim 5, wherein the intensity of light detected by the first element of the multiple element detector while the scene is illuminated by the second illumination pattern is less than the intensity of light detected by the first element of the multiple element detector while the scene is illuminated by the first illumination pattern.

9. The method of claim 2, wherein outputting light in a second illumination pattern includes steering a first one of the beams independently of a second one of the beams in the first plurality of beams.

10. The method of claim 1, wherein outputting light in a second illumination pattern includes electronically altering the first illumination pattern to create the second illumination pattern.

11. A lidar system, including:
   a light source, wherein the light source generates at least a first light pulse comprising a first beam of light;
   a first acoustic optic modulator, wherein the beam of light generated by the light source is provided to the first acoustic optic modulator;
   a first radio frequency driver, wherein a selected number of radio frequencies are output to the first acoustic optic modulator by the first radio frequency driver, and wherein a first illumination pattern including a number of steerable beams corresponding to the selected number of radio frequencies are output from the first acoustic optic modulator in response to the selected number of radio frequencies at a first point in time;
   a focal plane array;
   a controller, wherein the controller is in communication with at least the light source, the first radio frequency driver, and the focal plane array, wherein a time at which the first light pulse is generated by the light source and a time at which a return signal comprising at least some light from the first light pulse is received at the focal plane array provides range information, wherein information regarding an intensity of the return signal is provided to the controller, wherein the information regarding an intensity of the return signal is used to determine at least one parameter of a control signal provided by the controller to the first radio frequency driver, wherein the at least one parameter of the control signal provided by the controller to the first radio frequency driver is applied in outputting a second illumination pattern at a second point in time, and wherein the first and second illumination patterns are different from one another.

12. The system of claim 11, wherein the at least one parameter of a control signal includes an intensity of a first steerable beam output from the first acoustic optic modulator and an intensity of a second steerable beam output from the first acoustic optic modulator, wherein the intensity of the first steerable beam relative to the second steerable beam is changed between the first light pulse generated by the light source and a second pulse generated by the light source.

13. The system of claim 11, wherein the at least one parameter of a control signal includes a steering angle of first, second and third steerable beams output from the first acoustic optic modulator, wherein the first steerable beam is steered independently of the second and third steerable beams.

* * * * *